US012010675B2

(12) United States Patent
Lei et al.

(10) Patent No.: US 12,010,675 B2
(45) Date of Patent: Jun. 11, 2024

(54) USER EQUIPMENT GROUPING FOR UPLINK NON-ORTHOGONAL MULTIPLE ACCESS

(71) Applicant: Qualcomm Incorporated, San Diego, CA (US)

(72) Inventors: Jing Lei, San Diego, CA (US); Wanshi Chen, San Diego, CA (US); Yiqing Cao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 487 days.

(21) Appl. No.: 17/260,582

(22) PCT Filed: Aug. 1, 2019

(86) PCT No.: PCT/CN2019/098832
§ 371 (c)(1),
(2) Date: Jan. 15, 2021

(87) PCT Pub. No.: WO2020/025019
PCT Pub. Date: Feb. 6, 2020

(65) Prior Publication Data
US 2021/0274515 A1    Sep. 2, 2021

(30) Foreign Application Priority Data

Aug. 1, 2018  (WO) ................ PCT/CN2018/098021

(51) Int. Cl.
*H04W 72/121* (2023.01)
*H04L 5/00* (2006.01)
*H04W 8/24* (2009.01)
*H04W 72/044* (2023.01)
*H04W 72/0446* (2023.01)
*H04W 72/0453* (2023.01)

(52) U.S. Cl.
CPC ......... *H04W 72/121* (2013.01); *H04L 5/0005* (2013.01); *H04W 8/24* (2013.01);
(Continued)

(58) Field of Classification Search
CPC . H04W 72/121; H04W 8/24; H04W 72/0446; H04W 72/0453; H04W 72/0466;
(Continued)

(56) References Cited

U.S. PATENT DOCUMENTS

| 10,014,968 | B2 | 7/2018 | Ohwatari et al. |
| 2015/0245320 | A1* | 8/2015 | Chen ................. H04L 5/0091 370/329 |

(Continued)

FOREIGN PATENT DOCUMENTS

| CN | 104158631 A | 11/2014 |
| CN | 104869655 A | 8/2015 |

(Continued)

OTHER PUBLICATIONS

Supplementary European Search Report—EP19844243—Search Authority—The Hague—dated Mar. 31, 2022.

(Continued)

*Primary Examiner* — Thai Nguyen
(74) *Attorney, Agent, or Firm* — Holland & Hart LLP /Qualcomm Incorporated

(57) ABSTRACT

Methods, systems, and devices for wireless communications are described. One or more multiple access-capable user equipments (UEs) may be grouped together for transmitting uplink multiple access communications to a base station, where the UEs may be assigned to the group based on similar capabilities or service requirements. The UE may receive configuration information based at least in part on the group to which the UE has been assigned. When assigned to a group, the UEs may also receive a group-specific scrambling code for the uplink multiple access communications, a group-specific power control for the uplink multiple access communications, time and frequency resources to be used for the uplink multiple access commu- (Continued)

nications specific to the group, or a combination thereof. Additionally, the specific time and frequency resources may be defined by multiple access resource units.

29 Claims, 21 Drawing Sheets

(52) U.S. Cl.
CPC ... *H04W 72/0446* (2013.01); *H04W 72/0453* (2013.01); *H04W 72/0466* (2013.01)

(58) Field of Classification Search
CPC ... H04L 5/0005; H04L 5/0053; H04L 1/0023; H04L 5/003; H04J 13/0003; H04J 13/16; H04J 13/0077
See application file for complete search history.

(56) References Cited

U.S. PATENT DOCUMENTS

| | | | |
|---|---|---|---|
| 2016/0119807 A1* | 4/2016 | Sun | H04L 5/0091 370/252 |
| 2016/0353424 A1 | 12/2016 | Stirling-Gallacher et al. | |
| 2017/0078973 A1 | 3/2017 | Ohwatari et al. | |
| 2018/0084495 A1 | 3/2018 | Moon et al. | |
| 2018/0295651 A1* | 10/2018 | Cao | H04W 74/0833 |
| 2019/0029031 A1 | 1/2019 | Kumar et al. | |

FOREIGN PATENT DOCUMENTS

| | | | |
|---|---|---|---|
| CN | 105743824 A | 7/2016 | |
| CN | 106664153 A | 5/2017 | |
| CN | 107078834 A | 8/2017 | |
| WO | WO-2017055271 A1 * | 4/2017 | |
| WO | WO-2017139005 A1 * | 8/2017 | ............ H04L 5/003 |
| WO | WO-2018031620 A1 * | 2/2018 | |
| WO | WO-2019089033 A1 * | 5/2019 | ........... H04L 5/0094 |

OTHER PUBLICATIONS

International Search Report and Written Opinion—PCT/CN2018/098021—ISA/EPO—dated Apr. 28, 2019.
International Search Report and Written Opinion—PCT/CN2019/098832—ISA/EPO—dated Nov. 7, 2019.

* cited by examiner

USER EQUIPMENT GROUPING FOR UPLINK NON-ORTHOGONAL MULTIPLE ACCESS

CROSS REFERENCE TO RELATED APPLICATIONS

The present Application for Patent claims priority to International Patent Application No. PCT/CN2019/098832 by Lei et. al., entitled "USER EQUIPMENT GROUPING FOR UPLINK NON-ORTHOGONAL MULTIPLE ACCESS," filed Aug. 1, 2019; and to International Patent Application No. PCT/CN2018/098021 by Lei et. al., entitled "USER EQUIPMENT GROUPING FOR UPLINK NON-ORTHOGONAL MULTIPLE ACCESS," filed Aug. 1, 2018, each of which is assigned to the assignee hereof and each of which is hereby incorporated by reference in its entirety.

BACKGROUND

The following relates generally to wireless communications, and more specifically to user equipment (UE) grouping for uplink multiple access.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as UE.

Some wireless communications systems may support multiple access techniques for multiple users by sharing available system resources (e.g., time, frequency, and power). In some cases, non-orthogonal multiple access (NOMA) techniques may outperform orthogonal multiple access (OMA) techniques and may allow multiple different transmitters (e.g., UEs) to transmit concurrent transmissions over common time, frequency, and spatial resources. However, the different transmitters may differ in service requirements and/or capabilities. Efficient and reliable techniques for implementing NOMA for multiple UEs in a wireless communications system may thus be desirable in order to meet the service requirements and capabilities for the multiple UEs.

SUMMARY

The described techniques relate to improved methods, systems, devices, and apparatuses that support user equipment (UE) grouping for uplink non-orthogonal multiple access (NOMA). For example, the described techniques may relate to UE grouping for a two-step random access channel (RACH) procedure. A two-step RACH procedure may be an example of NOMA. Generally, the described techniques provide for grouping NOMA-capable UEs based on capability indications from the NOMA-capable UEs and transmitting NOMA communications based on the groupings. For example, a UE may transmit an indication that it is capable of performing NOMA, receive an assignment to be a member of a group of other NOMA-capable UEs (e.g., a group assignment), and transmit uplink NOMA communications to a base station based on the assigned group. In some cases, the group assignment may include a group-specific scrambling code for the NOMA communications, a group-specific power control for the NOMA communications, specific time and frequency resources to be used for the NOMA communications, or a combination thereof. The specific time and frequency resources may be the same as, differ from, or at least partially overlap with time and frequency resources for other groups of NOMA-capable UEs. Additionally, the specific time and frequency resources may be defined by one or more NOMA resource units, where each NOMA resource unit occupies a predefined number of orthogonal frequency division multiplexing (OFDM) symbols and a predefined number of physical resource blocks (PRBs) or sub-PRBs. In some cases, the group assignment may be transmitted via radio resource control (RRC) signaling, via a group-common physical downlink control channel (PDCCH) message, via remaining minimum system information (RMSI), or by UE-specific dynamic downlink control information (DCI).

A method of wireless communication at a UE is described. The method may include optionally transmitting, by the UE, a capability indication that the UE is capable of performing uplink multiple access, receiving, from a base station, an assignment that the UE is to be a member of a group of a set of groups of uplink multiple access-capable UEs, receiving, from the base station, configuration information based at least in part on the group to which the UE has been assigned, and transmitting one or more uplink multiple access communications to the base station based on the group to which the UE has been assigned.

An apparatus for wireless communication at a UE is described. The apparatus may include a processor, memory in electronic communication with the processor, and instructions stored in the memory. The instructions may be executable by the processor to cause the apparatus to optionally transmit, by the UE, a capability indication that the UE is capable of performing uplink multiple access, receive, from a base station, an assignment that the UE is to be a member of a group of a set of groups of uplink multiple access-capable UEs, receive, from the base station, configuration information based at least in part on the group to which the UE has been assigned, and transmit one or more uplink multiple access communications to the base station based on the group to which the UE has been assigned.

Another apparatus for wireless communication at a UE is described. The apparatus may include means for optionally transmitting, by the UE, a capability indication that the UE is capable of performing uplink multiple access, receiving, from a base station, an assignment that the UE is to be a member of a group of a set of groups of uplink multiple access-capable UEs, means for receiving, from the base station, configuration information based at least in part on the group to which the UE has been assigned, and transmitting one or more uplink multiple access communications to the base station based on the group to which the UE has been assigned.

A non-transitory computer-readable medium storing code for wireless communication at a UE is described. The code may include instructions executable by a processor to optionally transmit, by the UE, a capability indication that the UE is capable of performing uplink multiple access, receive, from a base station, an assignment that the UE is to be a member of a group of a set of groups of uplink multiple access-capable UEs, receive, from the base station, configuration information based at least in part on the group to which the UE has been assigned, and transmit one or more uplink multiple access communications to the base station based on the group to which the UE has been assigned.

In some examples of the method, apparatuses, and non-transitory computer-readable medium described herein, receiving the assignment that the UE may be to be a member of the group may include operations, features, means, or instructions for receiving a group-specific indication that the UE may be to apply a group-specific scrambling code to the one or more uplink multiple access communications.

In some examples of the method, apparatuses, and non-transitory computer-readable medium described herein, receiving the assignment that the UE may be to be a member of the group may include operations, features, means, or instructions for receiving a group-specific indication that the UE may be to apply a group-specific power control for transmission of the one or more uplink multiple access communications.

In some examples of the method, apparatuses, and non-transitory computer-readable medium described herein, the group-specific power control includes a target receive power range associated with the group.

In some examples of the method, apparatuses, and non-transitory computer-readable medium described herein, receiving the assignment that the UE may be to be a member of the group may include operations, features, means, or instructions for receiving a group-specific indication that the UE may be to use specific time and frequency resources for transmission of the one or more uplink multiple access communications.

In some examples of the method, apparatuses, and non-transitory computer-readable medium described herein, the specific time and frequency resources indicated to the UE by the group-specific indication either differ completely or partially with time and frequency resources assigned to other groups of the set of groups of uplink multiple access-capable UEs.

In some examples of the method, apparatuses, and non-transitory computer-readable medium described herein, a degree of overlap between the specific time and frequency resources indicated to the UE by the group-specific indication and time and frequency resources assigned to other groups of the set of groups of uplink multiple access-capable UEs may be preconfigured.

In some examples of the method, apparatuses, and non-transitory computer-readable medium described herein, a degree of overlap between the specific time and frequency resources indicated to the UE by the group-specific indication and time and frequency resources assigned to other groups of the set of groups of uplink multiple access-capable UEs may be based on a quality of service capability associated with the uplink multiple access-capable UEs.

In some examples of the method, apparatuses, and non-transitory computer-readable medium described herein, the specific time and frequency resources indicated to the UE by the group-specific indication represent a fraction of total time and frequency resources assigned to the set of groups of uplink multiple access-capable UEs, with at least some groups being assigned different fractions.

In some examples of the method, apparatuses, and non-transitory computer-readable medium described herein, a number of uplink multiple access-capable UEs in the group differs from a number of uplink multiple access-capable UEs in at least one other of the set of groups.

In some examples of the method, apparatuses, and non-transitory computer-readable medium described herein, the specific time and frequency resources may be defined by one or more multiple access resource units, each multiple access resource unit occupying a predefined number of OFDM symbols and a predefined number of PRBs or sub-PRBs.

In some examples of the method, apparatuses, and non-transitory computer-readable medium described herein, the predefined number of sub-PRBs may be a fraction of tones of a single PRB.

In some examples of the method, apparatuses, and non-transitory computer-readable medium described herein, the predefined number of sub-PRBs includes consecutive or non-consecutive tones of a single PRB.

In some examples of the method, apparatuses, and non-transitory computer-readable medium described herein, at least one of the predefined number of OFDM symbols or the predefined number of PRBs or sub-PRBs may be based on a system numerology and a capability of the uplink multiple access-capable UEs.

Some examples of the method, apparatuses, and non-transitory computer-readable medium described herein may further include operations, features, means, or instructions for receiving a multiple access resource unit indication indicating the predefined number of OFDM symbols and the predefined number of PRBs or sub-PRBs.

In some examples of the method, apparatuses, and non-transitory computer-readable medium described herein, receiving the assignment that the UE may be to be a member of the group may include operations, features, means, or instructions for receiving the assignment as a preconfigured assignment via RRC signaling.

In some examples of the method, apparatuses, and non-transitory computer-readable medium described herein, receiving the assignment that the UE may be to be a member of the group may include operations, features, means, or instructions for receiving the assignment as a dynamically-configured assignment via either a group-common PDCCH message or via RMSI.

In some examples of the method, apparatuses, and non-transitory computer-readable medium described herein, receiving the assignment that the UE may be to be a member of the group may include operations, features, means, or instructions for receiving the assignment via UE-specific dynamic DCI.

In some examples of the method, apparatuses, and non-transitory computer-readable medium described herein, a number of the set of groups of uplink multiple access-capable UEs may be based on a total number of uplink multiple access-capable UEs in communication with the base station and a number of orthogonal or quasi-orthogonal multiple access (MA) signatures supported by the total number of uplink multiple access-capable UEs.

In some examples of the method, apparatuses, and non-transitory computer-readable medium described herein, the orthogonal or quasi-orthogonal MA signatures vary by spreading codes, scrambling codes, permutation patterns, sparsity patterns, or combinations thereof.

In some examples of the method, apparatuses, and non-transitory computer-readable medium described herein, the configuration information includes at least one of a set of pre-configured rules for a resource configuration and information associated with a multiple access signature generation.

A method of wireless communication at a base station is described. The method may include receiving, from a set of UEs, a corresponding set of capability indications that each UE of the set of UEs is capable of performing uplink multiple access, transmitting an assignment to at least one UE of the set of UEs that the UE is to be a member of a group of a set of groups of uplink multiple access-capable UEs, and receiving one or more uplink multiple access communications from the UE based on the group to which the UE has been assigned.

An apparatus for wireless communication at a base station is described. The apparatus may include a processor, memory in electronic communication with the processor, and instructions stored in the memory. The instructions may be executable by the processor to cause the apparatus to receive, from a set of UEs, a corresponding set of capability indications that each UE of the set of UEs is capable of performing uplink multiple access, transmit an assignment to at least one UE of the set of UEs that the UE is to be a member of a group of a set of groups of uplink multiple access-capable UEs, and receive one or more uplink multiple access communications from the UE based on the group to which the UE has been assigned.

Another apparatus for wireless communication at a base station is described. The apparatus may include means for receiving, from a set of UEs, a corresponding set of capability indications that each UE of the set of UEs is capable of performing uplink multiple access, transmitting an assignment to at least one UE of the set of UEs that the UE is to be a member of a group of a set of groups of uplink multiple access-capable UEs, and receiving one or more uplink multiple access communications from the UE based on the group to which the UE has been assigned.

A non-transitory computer-readable medium storing code for wireless communication at a base station is described. The code may include instructions executable by a processor to receive, from a set of UEs, a corresponding set of capability indications that each UE of the set of UEs is capable of performing uplink multiple access, transmit an assignment to at least one UE of the set of UEs that the UE is to be a member of a group of a set of groups of uplink multiple access-capable UEs, and receive one or more uplink multiple access communications from the UE based on the group to which the UE has been assigned.

In some examples of the method, apparatuses, and non-transitory computer-readable medium described herein, transmitting the assignment that the UE may be to be a member of the group may include operations, features, means, or instructions for transmitting a group-specific indication that the UE may be to apply a group-specific scrambling code to the one or more uplink multiple access communications.

In some examples of the method, apparatuses, and non-transitory computer-readable medium described herein, transmitting the assignment that the UE may be to be a member of the group may include operations, features, means, or instructions for transmitting a group-specific indication that the UE may be to apply a group-specific power control for transmission of the one or more uplink multiple access communications.

In some examples of the method, apparatuses, and non-transitory computer-readable medium described herein, the group-specific power control includes a target receive power range associated with the group.

In some examples of the method, apparatuses, and non-transitory computer-readable medium described herein, transmitting the assignment that the UE may be to be a member of the group may include operations, features, means, or instructions for transmitting a group-specific indication that the UE may be to use specific time and frequency resources for transmission of the one or more uplink multiple access communications.

In some examples of the method, apparatuses, and non-transitory computer-readable medium described herein, the specific time and frequency resources indicated to the UE by the group-specific indication either differ completely or partially with time and frequency resources assigned to other groups of the set of groups of uplink multiple access-capable UEs.

In some examples of the method, apparatuses, and non-transitory computer-readable medium described herein, a degree of overlap between the specific time and frequency resources indicated to the UE by the group-specific indication and time and frequency resources assigned to other groups of the set of groups of uplink multiple access-capable UEs may be preconfigured.

Some examples of the method, apparatuses, and non-transitory computer-readable medium described herein may further include operations, features, means, or instructions for determining a degree of overlap between the specific time and frequency resources indicated to the UE by the group-specific indication and time and frequency resources assigned to other groups of the set of groups of uplink multiple access-capable UEs based on a quality of service capability associated with the uplink multiple access-capable UEs.

In some examples of the method, apparatuses, and non-transitory computer-readable medium described herein, the specific time and frequency resources indicated to the UE by the group-specific indication represent a fraction of total time and frequency resources assigned to the set of groups of uplink multiple access-capable UEs, with at least some groups being assigned different fractions.

In some examples of the method, apparatuses, and non-transitory computer-readable medium described herein, a number of uplink multiple access-capable UEs in the group differs from a number of uplink multiple access-capable UEs in at least one other of the set of groups.

In some examples of the method, apparatuses, and non-transitory computer-readable medium described herein, the specific time and frequency resources may be defined by one or more multiple access resource units, each multiple access resource unit occupying a predefined number of OFDM symbols and a predefined number of PRBs or sub-PRBs.

In some examples of the method, apparatuses, and non-transitory computer-readable medium described herein, the predefined number of sub-PRBs may be a fraction of tones of a single PRB.

In some examples of the method, apparatuses, and non-transitory computer-readable medium described herein, the predefined number of sub-PRBs includes consecutive or non-consecutive tones of a single PRB.

In some examples of the method, apparatuses, and non-transitory computer-readable medium described herein, at least one of the predefined number of OFDM symbols or the predefined number of PRBs or sub-PRBs may be based on a system numerology and a capability of the uplink multiple access-capable UEs.

Some examples of the method, apparatuses, and non-transitory computer-readable medium described herein may further include operations, features, means, or instructions for transmitting a multiple access resource unit indication indicating the predefined number of OFDM symbols and the predefined number of PRBs or sub-PRBs.

In some examples of the method, apparatuses, and non-transitory computer-readable medium described herein, transmitting the assignment that the UE may be to be a member of the group may include operations, features, means, or instructions for transmitting the assignment as a preconfigured assignment via RRC signaling.

In some examples of the method, apparatuses, and non-transitory computer-readable medium described herein, transmitting the assignment that the UE may be to be a member of the group may include operations, features, means, or instructions for transmitting the assignment as a dynamically-configured assignment via either a group-common PDCCH message or via RMSI.

In some examples of the method, apparatuses, and non-transitory computer-readable medium described herein, transmitting the assignment that the UE may be to be a member of the group may include operations, features, means, or instructions for transmitting the assignment via UE-specific dynamic DCI.

In some examples of the method, apparatuses, and non-transitory computer-readable medium described herein, a number of the set of groups of uplink multiple access-capable UEs may be based on a total number of uplink multiple access-capable UEs in communication with the base station and a number of orthogonal or quasi-orthogonal MA signatures supported by the total number of uplink multiple access-capable UEs.

In some examples of the method, apparatuses, and non-transitory computer-readable medium described herein, the orthogonal or quasi-orthogonal MA signatures vary by spreading codes, scrambling codes, permutation patterns, sparsity patterns, or combinations thereof.

DETAILED DESCRIPTION

Figure 1:
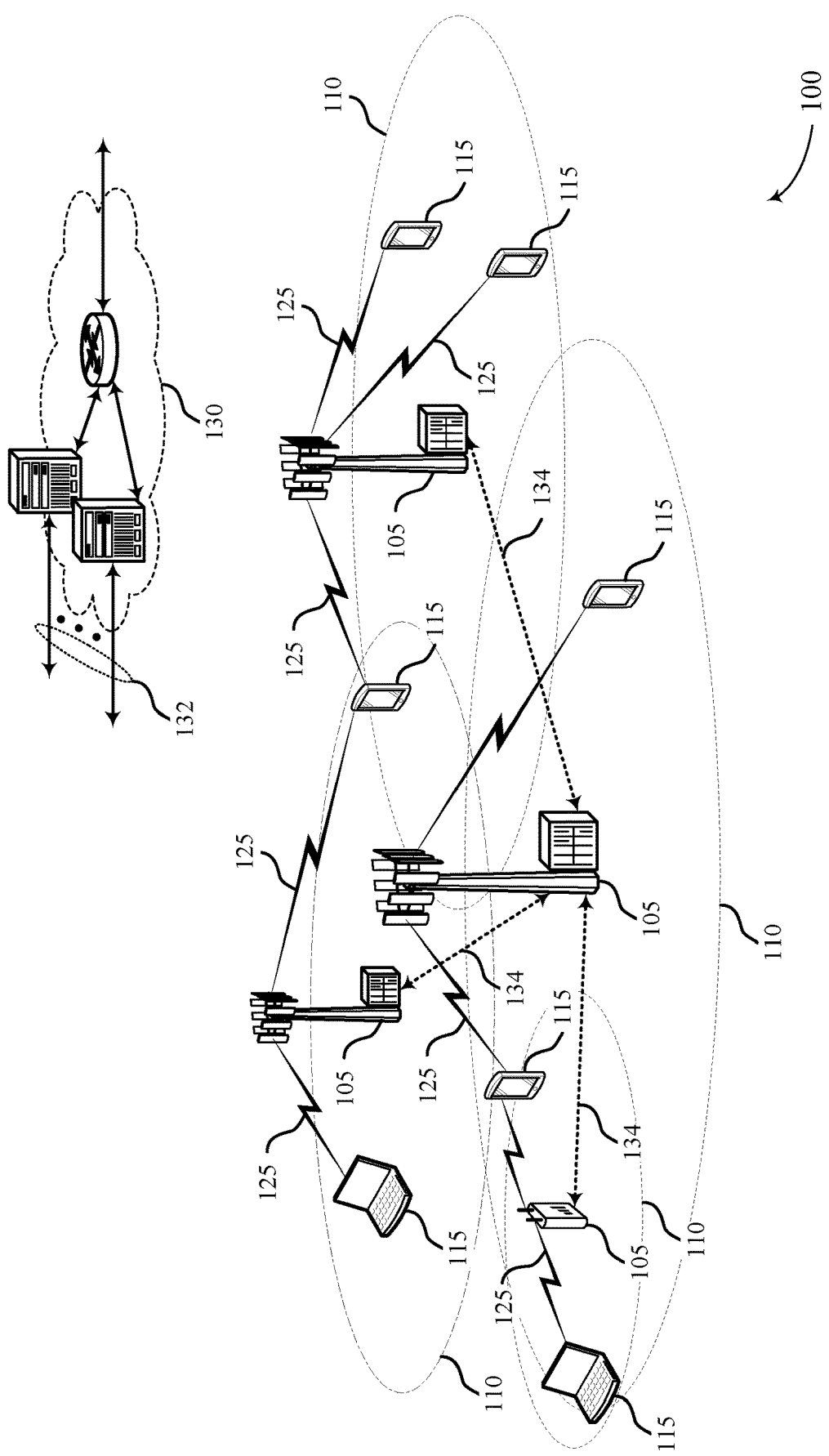
FIG. 1 illustrates an example of a system for wireless communications that supports user equipment (UE) grouping for uplink non-orthogonal multiple access (NOMA) in accordance with aspects of the present disclosure.

Some wireless communications systems may support multiple access techniques for multiple users by sharing available system resources (e.g., time, frequency, and power). In some cases, non-orthogonal multiple access (NOMA) techniques, such as a two-step random access channel (RACH) procedure, may outperform orthogonal multiple access techniques for some types of transmissions. NOMA techniques may enable access to more system bandwidth for transmitting devices (e.g., a user equipment (UE)), while simultaneously enabling a greater number of users to communicate on a set of time frequency resources. For example, NOMA techniques may enable multiple UEs (e.g., NOMA UEs) to concurrently transmit over the same time-frequency resources without frequency selective fading that can occur with code-division spreading techniques and without the overhead or dependency on channel conditions of orthogonal spatial layers. As the number of UEs that utilize the NOMA techniques increases (e.g., which may further increase an overloading ratio for the UEs), correlation properties of the UEs may get worse and intercell interference may increase. For example, within a same cell, the NOMA UEs may differ in quality of service (QoS) requirements and/or UE capabilities, which may affect the correlation properties for the NOMA UEs (e.g., intercell interference).

To reduce the number of overloaded UEs and weaken the correlation between UEs, a grouping scheme for uplink NOMA may be utilized that takes into account differences in QoS requirements and UE capabilities. For example, NOMA UEs with similar QoS requirements and capabilities may be grouped together to share a same set of time and frequency resources for uplink NOMA communications, where the NOMA UEs in each group are code division multiplexed (CDMed) and the code multiplexing scheme can be orthogonal multiple access (OMA) or NOMA. The set of time and frequency resources may be configured into one or more NOMA resource units that occupy L orthogonal frequency division multiplexing (OFDM) symbols and Q physical resource blocks (PRBs) or sub-PRBs. Each group of NOMA UEs may occupy multiple NOMA resource units, where the multiple NOMA resource units may span multiple slots. In some cases, NOMA resource units may overlap (e.g., partially) between one or more groups of NOMA UEs, which may increase spectral efficiency and decrease decoding complexity. Additionally or alternatively, each group may include a group-specific scrambling code and/or a group-specific power control for transmitting any uplink NOMA communications. Multiple access (MA) signatures may be utilized to assist in distinguishing between transmissions from different UEs. The MA signatures may be given through different methods (e.g., spreading codes, scrambling codes, permutation pattern, sparsity pattern, etc.). In some cases, each group of NOMA UEs may utilize a separate MA signature.

Aspects of the disclosure are initially described in the context of a wireless communications system. An additional wireless communications system, NOMA resource units, examples of sub-PRBs, and a process flow are then described to provide additional aspects of the disclosure. Aspects of the disclosure are further illustrated by and described with reference to apparatus diagrams, system diagrams, and flowcharts that relate to UE grouping for uplink NOMA.

FIG. 1 illustrates an example of a wireless communications system 100 that supports UE grouping for uplink NOMA in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, one or more base stations 105 may configure one or more UEs 115 for NOMA communications. For example, the one or more UEs 115 may share the same time-frequency resources in a non-orthogonal way (e.g., different power levels, CDM, etc.). The non-orthogonality may be indicated through different MA signatures, where the MA signatures for the UEs 115 may be carried through different methods (e.g., spreading, permutation, sparsity pattern, etc.). As the number of UEs 115 that communicate according to NOMA increases, correlation properties of the UEs 115 may get worse and intercell interference may increase. For example, as an overloading ratio increases (e.g., ratio of a number of overloaded signals to that of orthogonal resource grids), the correlation properties between the UEs 115 may deteriorate, increasing inter- and/or intra-cell interference. Within a same cell, the UEs 115 may differ in QoS requirements and/or UE capabilities, which may further negatively impact the correlation properties.

Wireless communications system 100 may support efficient techniques for reducing the number of overloaded UEs 115 and weaken a correlation between the UEs 115 in a NOMA system by grouping the UEs 115 for uplink NOMA communications by taking into account differences in QoS requirements and UE capabilities. For example, UEs 115 with similar QoS requirements and capabilities may be grouped together to share a same set of time and frequency resources for uplink NOMA communications. Additionally, the UEs 115 in each group may be CDMed, and the code multiplexing scheme may be OMA or NOMA. In some cases, the set of time and frequency resources may be configured into one or more NOMA resource units that occupy L OFDM symbols and Q PRBs or sub-PRBs. The NOMA resource units may overlap (e.g., partially) between one or more groups of UEs 115, which may increase spectral efficiency and decrease decoding complexity. Additionally or alternatively, each group may include a group-specific scrambling code and/or a group-specific power control for transmitting any uplink NOMA communications.

An example of NOMA may be a two-step RACH process or procedure. A two-step RACH process may include a message A and a message B. The message A may include, for example, a preamble and a physical uplink control channel (PUCCH) portion. Message A may be an example of NOMA. In other examples, NOMA may include a four-step RACH process. In some examples, the multiple access may be grant-free multiple access.

Figure 2:
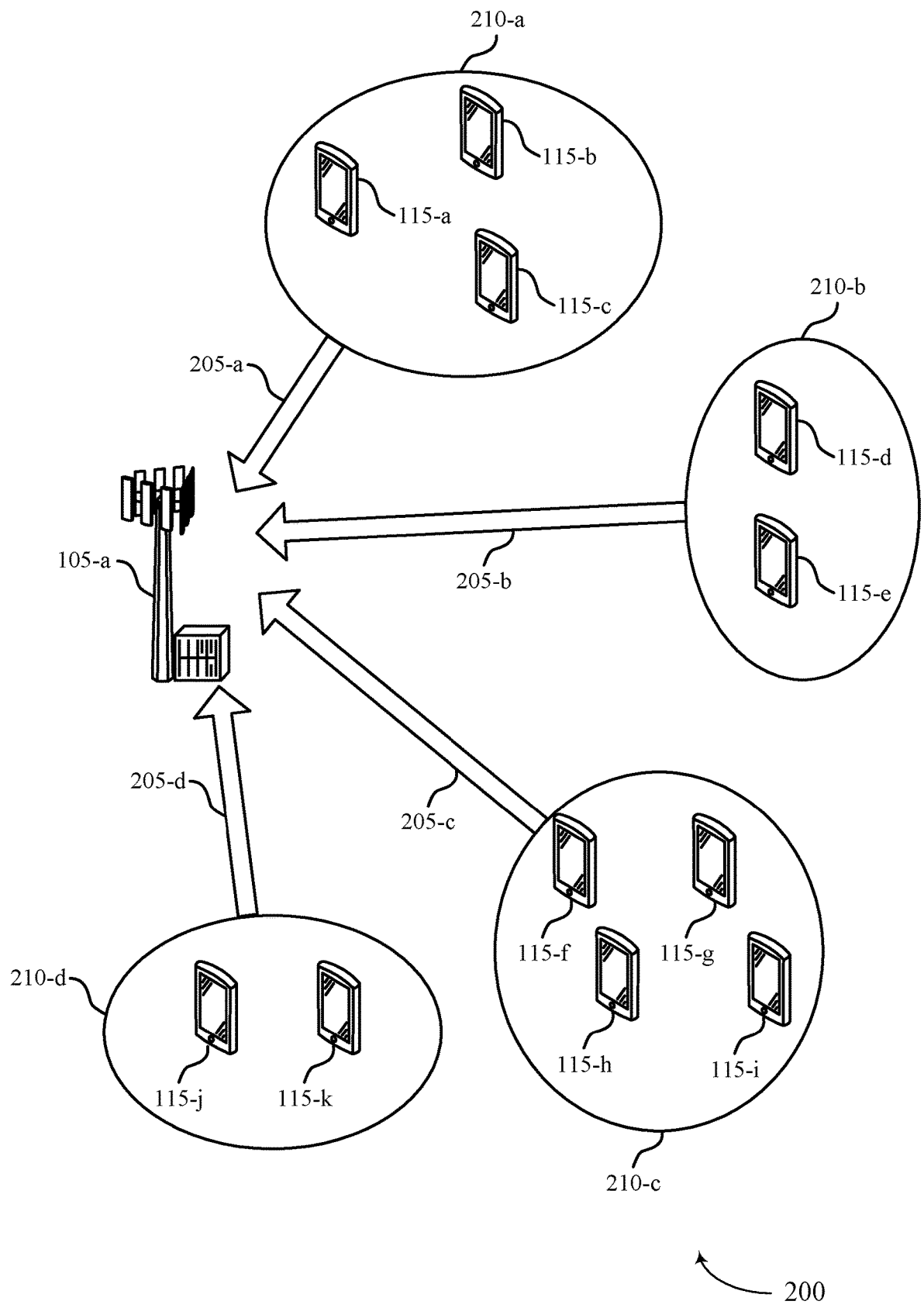
FIG. 2 illustrates an example of a wireless communications system that supports UE grouping for uplink NOMA in accordance with aspects of the present disclosure.

FIG. 2 illustrates an example of a wireless communications system 200 that supports UE grouping for uplink NOMA in accordance with aspects of the present disclosure. In some examples, wireless communications system 200 may implement aspects of wireless communications system 100. Wireless communications system 200 may include a base station 105-a and one or more UEs 115, which may be examples of corresponding base stations 105 and UEs 115 as described above with reference to FIG. 1. Additionally, base station 105-a and the one or more UEs 115 may be configured to communicate with NOMA.

As described herein, base station 105-a may assign the UEs 115 into one or more separate groups 210 based on a QoS requirements and UE capabilities for each UE 115. Base station 105-a may deliver this UE grouping information through dedicated signaling to the UEs 115. In some cases, base station 105-a may pre-configure the groups 210 and signal the configuration to the UEs 115 via RRC signaling. Additionally or alternatively, base station 105-a may dynamically configure the groups 210 and signal the configuration to the UEs 115 via a group-common physical downlink control channel (PDCCH) or via remaining minimum system information (RMSI). In other cases, base station 105-b may signal the configurations of groups 210 to each of the UEs 115 via UE-specific dynamic downlink control information (DCI). The UEs 115

UEs 115 in each group 210 may share a set of time and frequency resources for uplink NOMA communications 205. For example, the UEs 115 per group 210 may utilize the same time and frequency resources with CDM, where the code multiplexing scheme can be OMA or NOMA. In some cases, each group 210 may occupy different fractions of the time and frequency resources as the other groups 210. Additionally or alternatively, the time and frequency resources may overlap between groups 210 (e.g., cross correlation), where a subset of time and frequency resources are used by more than one group 210. In some cases, a ratio of overlapping may be preconfigured by the network (e.g., base station 105-a) that indicates how many resources can overlap between the groups 210. As shown, the number of UEs 115 per group 210 may be different. For example, group 210-a may include three (3) UEs 115 (e.g., UE 115-a, UE 115-b, and UE 115-c), group 210-b may include two (2) UEs 115 (e.g., UE 115-d and UE 115-e), group 210-c may include four (4) UEs 115 (e.g., UE 115-f, UE 115-g, UE 115-h, and UE 115-i), and group 210-d may include two (2) UEs 115 (e.g., UE 115-j and UE 115-k). The number of UEs 115 in each group 210 may be a function of the ratio of overlapping, UE capability, QoS, or a combination thereof.

In some cases, the time and frequency resources for the uplink NOMA communications 205 may be contained in one or more NOMA resource units (e.g., a common building block), where each group 210 may be assigned one or more NOMA resource units. Each NOMA resource unit may include a number of OFDM symbols (L) and a number of PRBs or sub-PRBs (Q). The sub-PRBs may include a fraction of tones in one PRB, where the fraction of tones can be consecutive or non-consecutive within the one PRB. In some cases, the size of a NOMA resource unit may be hard-coded for the UEs 115 and base station 105-a (e.g., specified for all UEs 115 and base stations 105 operating in a specific radio access network (RAN)) or pre-configured for the UEs 115 via RRC signaling. The resource units may have different sizes and can overlap. Two-step RACH may be utilized with resource units of different sizes, for example.

Resource units of different sizes may be assigned to different UE groups. Additionally or alternatively, L and Q may be a function of numerology (e.g., subcarrier spacing (SCS)) and UE capability. In some cases, a UE 115 or a group 210 of multiple UEs 115 may occupy one or more NOMA resource units. Accordingly, the bundling of NOMA resource units (e.g., multiple occupied NOMA resource units) may span multiple slots.

Additionally or alternatively, the groups 210 may be assigned based on a number of orthogonal or quasi-orthogonal MA signatures. For example, a number of MA signatures, K, may be utilized, and the groups 210 may be assigned with each having its own MA signature, such that a number of UEs 115, N, performing uplink NOMA may be assigned into (N/K) groups. Each MA signature may be given by a set of spreading codes, scrambling codes, permutation pattern, sparsity pattern, etc. Additionally, a group-specific scrambling code may be assigned to each group 210. As such, (N/K) different scrambling codes may be utilized. An open-loop or closed-loop power control may also be applied to each group 210. The power control may ensure that a received power of each group 210 is within a range $[P_l-\alpha_l, P_l+\alpha_l]$ decibel-milliwatts (dBm), where $P_l$ is a target received power for UEs 115 in a group l and $\alpha_l$ is a tolerance of power control error for UEs 115 in the group l. In some cases, the group-specific scrambling code and the open-loop or closed-loop power control may increase reliability of the uplink NOMA communications 205 from the UEs 115 to be correctly received by base station 105-a.

In some examples, the UEs 115 may make grant-free transmissions. For example, a UE 115 may choose its resources from a group of resources assigned by the base station 105. The UE 115 may provide an indication to the base station 105 that informs the base station 105 which resources the UE 115 used to transmit a message to the base station 105. The base station 105 may use information derived from the indication to decode the message from the UE 115.

Figure 3:
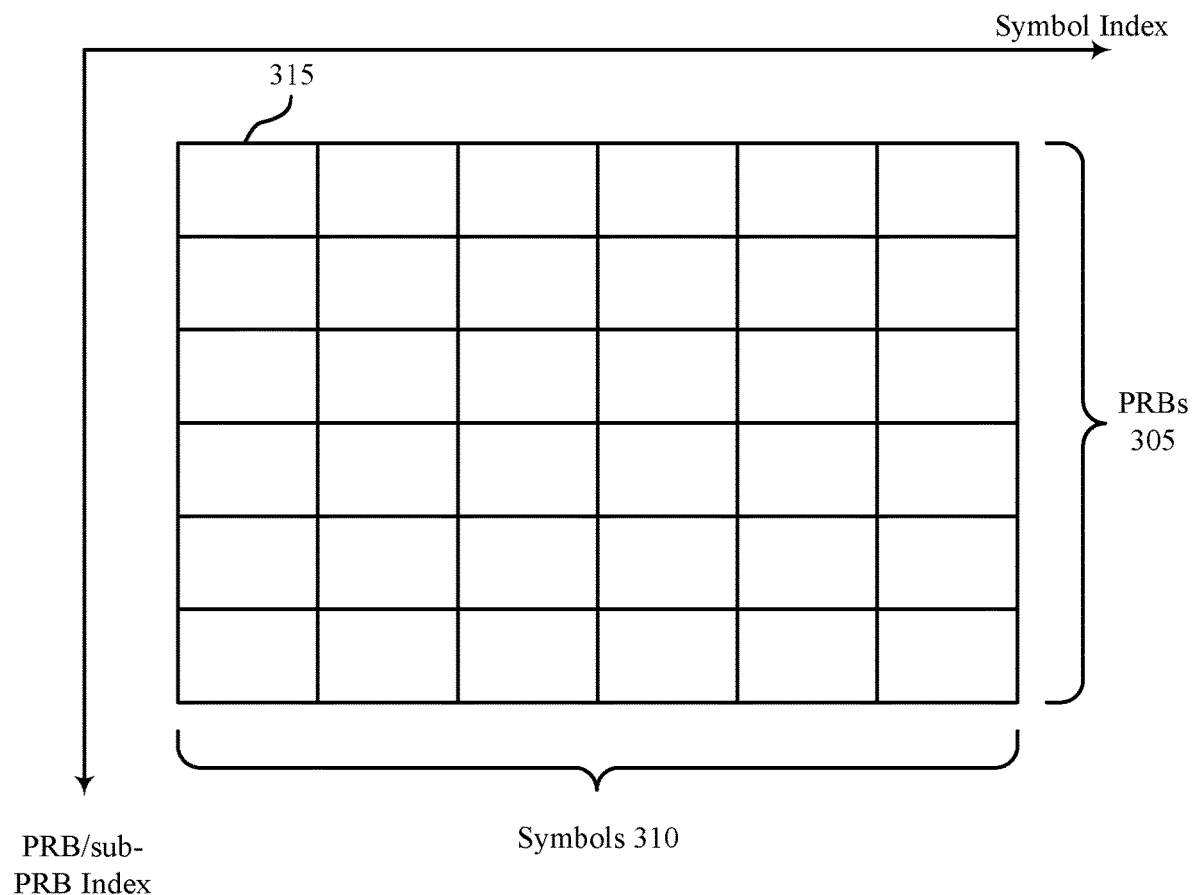
FIG. 3 illustrates an example of a NOMA resource unit that supports UE grouping for uplink NOMA in accordance with aspects of the present disclosure.
Figure 4A:
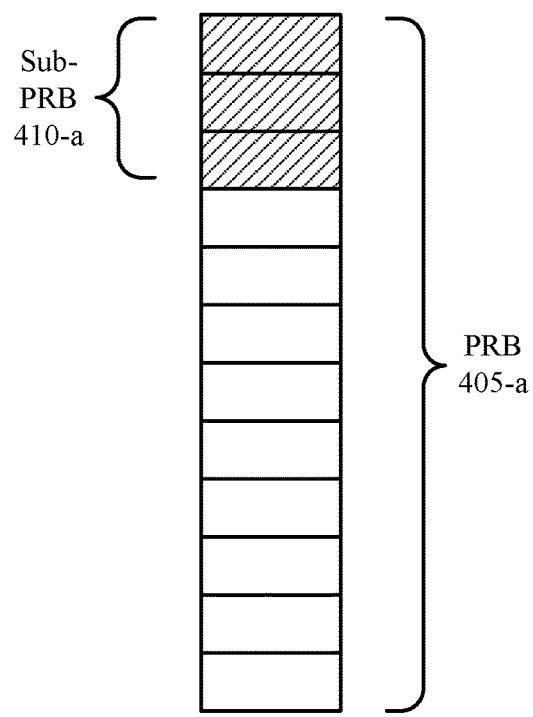
FIGS. 4A-4D illustrate examples of sub-physical resource block (sub-PRB) configurations that support UE grouping for uplink NOMA in accordance with aspects of the present disclosure.
Figure 4B:
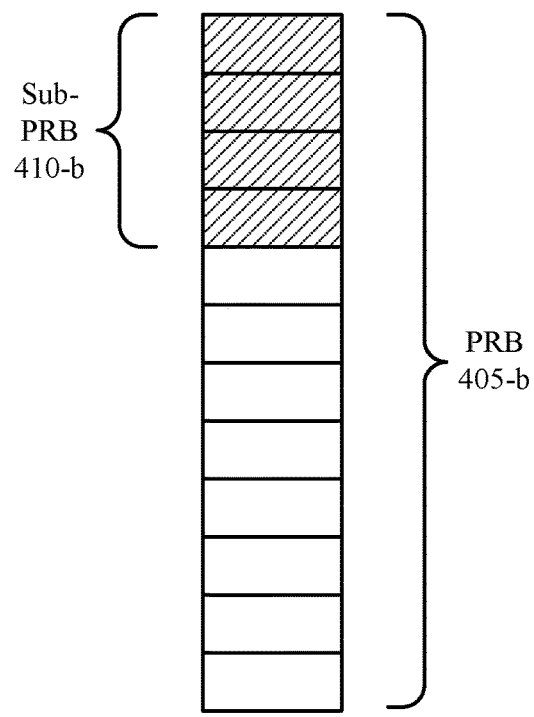
Figure 4C:
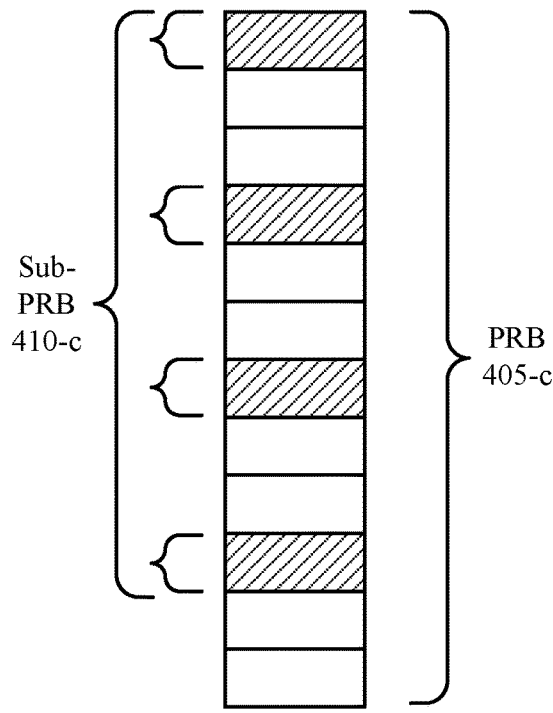
Figure 4D:
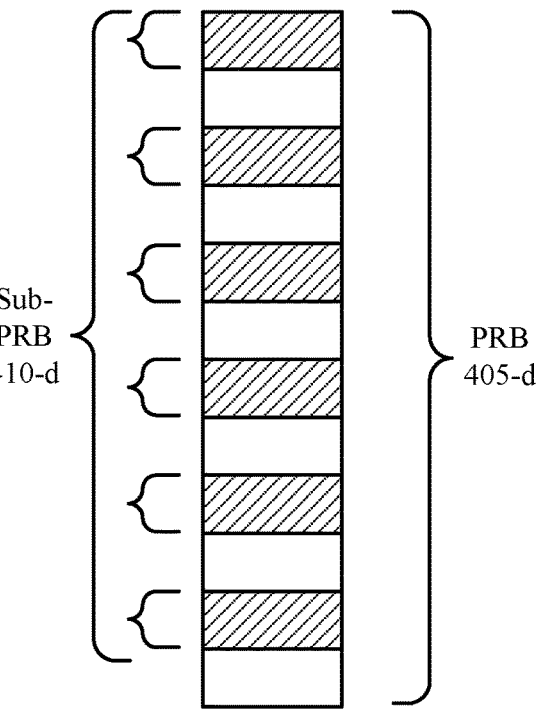

FIG. 3 illustrates an example of a NOMA resource unit 300 that supports UE grouping for uplink NOMA in accordance with aspects of the present disclosure. In some examples, NOMA resource unit 300 may implement aspects of wireless communications systems 100 and/or 200. As described herein, a base station 105 may assign UEs 115 into one or more groups for uplink NOMA communications. The UEs 115 in each group may share a same set of time and frequency resources for the uplink NOMA communications by non-orthogonally utilizing the set of time and frequency resources for simultaneous transmissions (e.g., through CDM, different power levels, etc.). The set of time and frequency resources may be defined by one or more NOMA resource units.

NOMA resource unit 300 may show an example of the set of time and frequency resources utilized for the uplink NOMA communications. NOMA resource unit 300 may occupy a set of PRBs or sub-PRBs 305, given by Q. Additionally, NOMA resource unit 300 may occupy a set number of OFDM symbols 310, given by L. As such, NOMA resource unit may include (Q×L) blocks 315 for the group of UEs 115 to utilize for the uplink NOMA communications in their corresponding group. As noted above with reference to FIG. 2, the size of NOMA resource unit 300 may be hard-coded for all UEs 115 or may be pre-configured for the UEs 115 via RRC signaling. Additionally, the values for Q and L may be a function of numerology and UE capability.

FIGS. 4A-4D illustrate examples of sub-PRB configurations 400-a, 400-b, 400-c, and 400-d, respectively, that support UE grouping for uplink NOMA in accordance with aspects of the present disclosure. In some examples, sub-PRB configurations 400-a, 400-b, 400-c, and 400-d may implement aspects of wireless communications systems 100 and/or 200. As described above, a NOMA resource unit may include Q PRBs or sub-PRBs and L OFDM symbols. Instead of using a whole PRB 405 for the NOMA resource unit, sub-PRBs 410 may be utilized, where each sub-PRB 410 occupies a fraction of the tones in one PRB 405. Additionally, the tones within a sub-PRB 410 may be consecutive or non-consecutive.

Sub-PRB configuration 400-a may illustrate a sub-PRB 410-a of a PRB 405-a. As shown, sub-PRB 410-a may include three (3) consecutive tones of PRB 405-a. Similarly, sub-PRB configuration 400-b may illustrate a sub-PRB 410-b that includes four (4) consecutive tones of PRB 405-b. In some cases, the consecutive tones may occur at the beginning of the PRB 405 and proceed in ascending index order (e.g., as shown) or may occur anywhere within the PRB 405.

Additionally or alternatively, sub-PRB configuration 400-c may illustrate a sub-PRB 410-c that includes four (4) interlaced tones in a PRB 405-c. Similarly, sub-PRB configuration 400-d may illustrate a sub-PRB 410-d that includes six (6) interlaced tones in a PRB 405-d. The interlaced tones may indicate discontinuous tones in the PRB 405 with uniform spacing between the tones.

Figure 5:
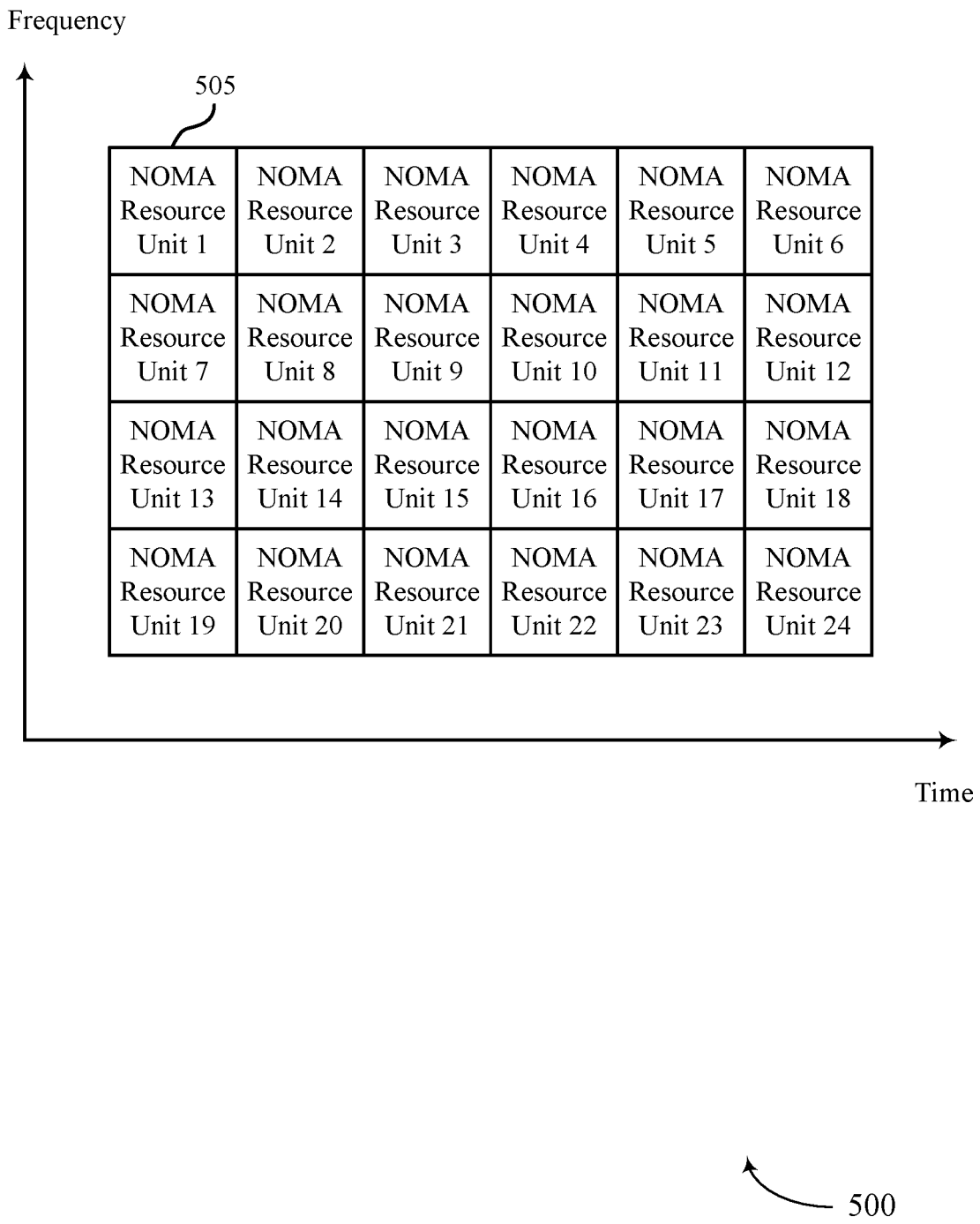
FIG. 5 illustrates an example of a NOMA resource unit arrangement that support UE grouping for uplink NOMA in accordance with aspects of the present disclosure.

FIG. 5 illustrates an example of a NOMA resource unit arrangement 500 that support UE grouping for uplink NOMA in accordance with aspects of the present disclosure. In some examples, NOMA resource unit arrangement 500 may implement aspects of wireless communications systems 100 and/or 200. As described herein, each group of assigned UEs 115 may further be assigned one or more NOMA resource units 505 of time and frequency resources to be shared for uplink NOMA communications.

In the example of NOMA resource unit arrangement 500, 24 orthogonal NOMA resource units 505 and 40 NOMA UEs 115 (e.g., UEs 115 that are capable of performing uplink NOMA) may be configured for the uplink NOMA communications. The configurations may be shown below in Table 1.

TABLE 1

| UE Group Configurations | | | |
|---|---|---|---|
| UE Group Index | Features | Index of Occupied NOMA Resource Units | Index of UEs |
| 1 | Narrow band, time bundling | 1 to 12 | 1 to 9 |
| 2 | Wide band, time bundling | 7 to 24 | 10 to 25 |
| 3 | Wideband, short time | {1, 7, 13, 19, 2, 8, 14, 20} | 26 to 30 |
| 4 | Hopping in time and frequency | {3, 15, 10, 22, 5, 17, 12, 24} | 31 to 40 |

Accordingly, the 40 NOMA UEs 115 may be partitioned into four (4) groups. In some cases, the number of NOMA UEs 115 may differ per group. For example, UE group 1 may include nine (9) NOMA UEs 115, UE group 2 may include 16 NOMA UEs 115, UE group 3 may include five (5) NOMA UEs 115, and UE group 4 may include 10 NOMA UEs 115. Each NOMA UE 115 may belong to one (1) group, where the NOMA UE 115 is assigned to the group based on associated features of the NOMA UE 115. For example, NOMA UEs 115 in UE group 4 may be grouped together based on similar capabilities and/or QoS requirements associated with time and frequency hopping.

Additionally, the NOMA UEs 115 in the same UE group may share the same set of NOMA resource units 505. In some cases, there may be a partial overlap in the NOMA resource unit allocation between the different UE groups. As an example, UE group 1 and UE group 2 may overlap in NOMA resource units 7-12, and UE group 2 and UE group 3 may overlap in NOMA resource units 7, 8, 13, 14, 19, and 20.

Figure 6:
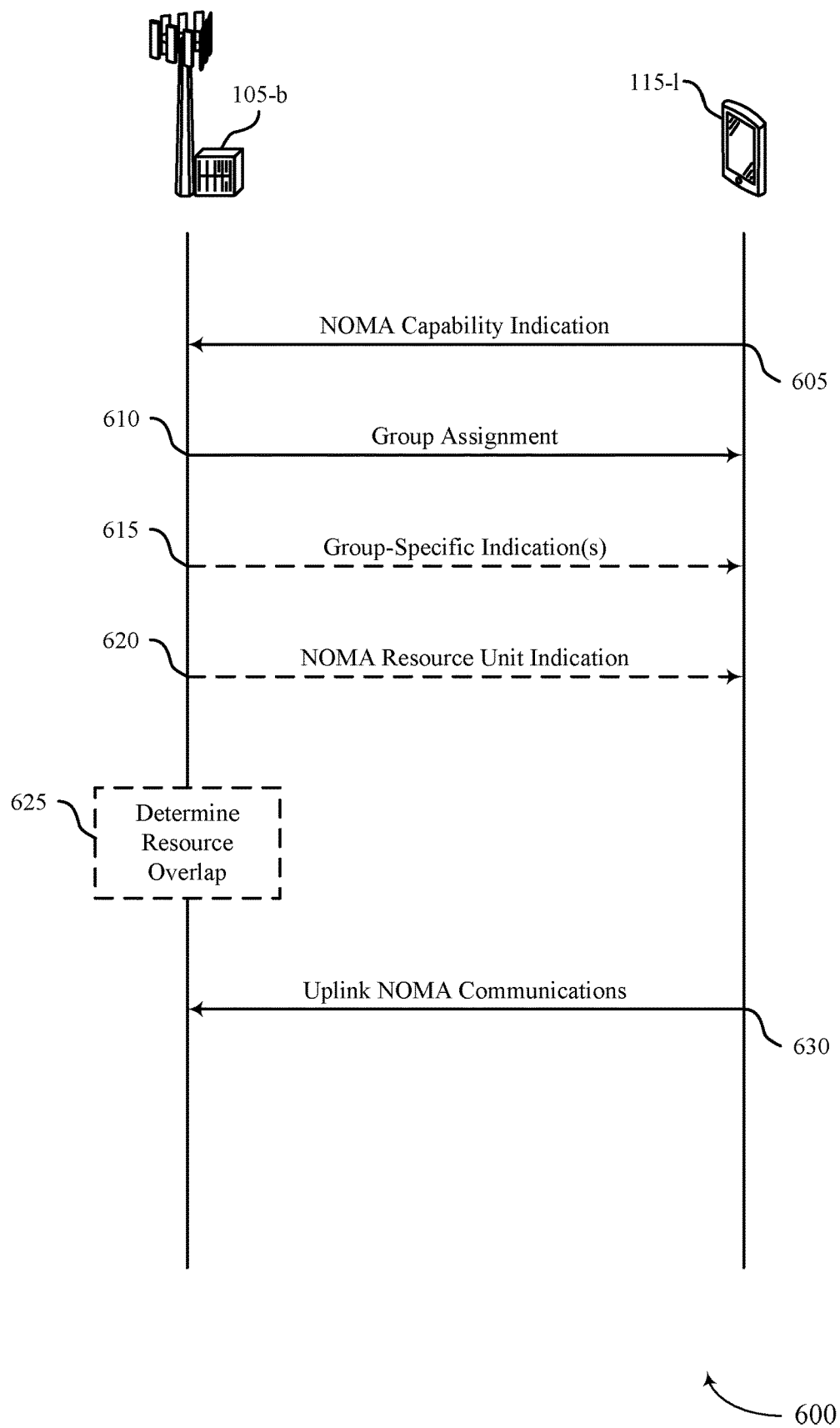
FIG. 6 illustrates an example of a process flow that supports UE grouping for uplink NOMA in accordance with aspects of the present disclosure.

FIG. 6 illustrates an example of a process flow 600 that supports UE grouping for uplink NOMA in accordance with aspects of the present disclosure. In some examples, process flow 600 may implement aspects of wireless communications systems 100 and/or 200. Process flow 600 may include a base station 105-*b* and a UE 115-1, which may be examples of a corresponding base station 105 and UE 115, respectively, as described above with reference to FIGS. 1-5.

In the following description of the process flow 600, the operations between UE 115-1 and base station 105-*b* may be performed in different orders or at different times. Certain operations may also be left out of the process flow 600, or other operations may be added to the process flow 600. It is to be understood that while UE 115-1 and base station 105-*b* are shown performing a number of the operations of process flow 600, any wireless device may perform the operations shown.

At 605, UE 115-1 may transmit, to base station 105-*b*, a capability indication that it is capable of performing uplink NOMA. In some cases, base station 105-*b* may receive a plurality of capability indication from a corresponding plurality of UEs 115 (e.g., including UE 115-1).

At 610, UE 115-1 may receive, from base station 105-*b*, an assignment that it is to be a member of a group of a plurality of groups of uplink NOMA-capable UEs. In some cases, UE 115-1 may receive the assignment as a preconfigured assignment via RRC signaling, as a dynamically-configured assignment via either a group-common PDCCH message or via RMSI, or via UE-specific dynamic DCI. Additionally, a number of the plurality of groups of uplink NOMA-capable UEs may be based on a total number of uplink NOMA-capable UEs 115 in communication with base station 105-*b* and a number of orthogonal or quasi-orthogonal MA signatures supported by the total number of uplink NOMA-capable UEs 115. In some cases, the orthogonal or quasi-orthogonal MA signatures may vary by spreading codes, scrambling codes, permutation patterns, sparsity patterns, or combinations thereof.

At 615, UE 115-1 may receive one or more group-specific indications for its assigned group. For example, UE 115-*a* may receive, from base station 105-*b*, configuration information based at least in part on the group to which UE 115-1 has been assigned. For example, UE 115-1 may receive configuration information that may include a a set of preconfigured rules for a resource configuration or information associated with a multiple access signature generation. Base station 105-*b* may pre-configure a set of rules for the UE grouping. The rules may relate to resource configuration (e.g., in time, frequency, space, code domains, etc.), link adaptation (e.g., modulation and coding scheme (MCS), power control, etc.), multiple access signature generation (e.g., scrambling code, spreading code, interleaving patterns, etc.), or the like. The configuration information may be sent in system information, RRC signaling, DCI, or a combination thereof. UE 115-1 may decode the set of configuration rules for the UE grouping and select a group-wise configuration for its multiple access message resource mapping, link adaptation, and multiple access signature generation, for example. UE 115-1 may keep or re-configure its group identity in its re-transmission of multiple access messages, if retransmission is needed.

In another example, UE 115-1 may receive a group-specific indication that the UE is to apply a group-specific scrambling code to the one or more uplink NOMA communications. Additionally, UE 115-1 may receive a group-specific indication that it is to apply a group-specific power control for transmission of the one or more uplink NOMA communications. In some cases, the group-specific power control may include a target receive power range associated with the group. These group-specific indications may be received as part of the configuration information or the group assignment.

Additionally or alternatively, UE 115-1 may receive a group-specific indication that the UE is to use specific time and frequency resources for transmission of the one or more uplink NOMA communications. In some cases, the specific time and frequency resources indicated to the UE by the group-specific indication either differ completely or partially with time and frequency resources assigned to other groups of the plurality of groups of uplink NOMA-capable UEs 115. For example, a degree of overlap between the specific time and frequency resources indicated to the UE by the group-specific indication and time and frequency resources assigned to other groups of the plurality of groups of uplink NOMA-capable UEs may be preconfigured. Additionally, the specific time and frequency resources indicated to the UE by the group-specific indication may represent a fraction of total time and frequency resources assigned to the plurality of groups of uplink NOMA-capable UEs 115, with at least some groups being assigned different fractions. In some cases, a number of uplink NOMA-capable UEs in the group may differ from a number of uplink NOMA-capable UEs in at least one other of the plurality of groups.

At 620, UE 115-1 may receive a NOMA resource unit indication indicating a predefined number of OFDM symbols and a predefined number of PRBs or sub-PRBs. In some cases, the specific time and frequency resources may be defined by one or more NOMA resource units, where each NOMA resource unit occupies a predefined number of OFDM symbols and a predefined number of PRBs or sub-PRBs. The predefined number of sub-PRBs may be a fraction of tones of a single PRB. Additionally or alternatively, the predefined number of sub-PRBs may include consecutive or non-consecutive tones of a single PRB. In some cases, at least one of the predefined number of OFDM symbols or the predefined number of PRBs or sub-PRBs may be based on a system numerology and a capability of the uplink NOMA-capable UEs 115.

At 625, base station 105-*b* may determine a degree of overlap between the specific time and frequency resources indicated to UE 115-1 by the group-specific indication and time and frequency resources assigned to other groups of the plurality of groups of uplink NOMA-capable UEs 115 based on a quality of service capability associated with the uplink NOMA-capable UEs 115.

At 630, UE 115-1 may transmit one or more uplink NOMA communications to the base station based at least in part on the group to which UE 115-1 has been assigned.

Figure 7:
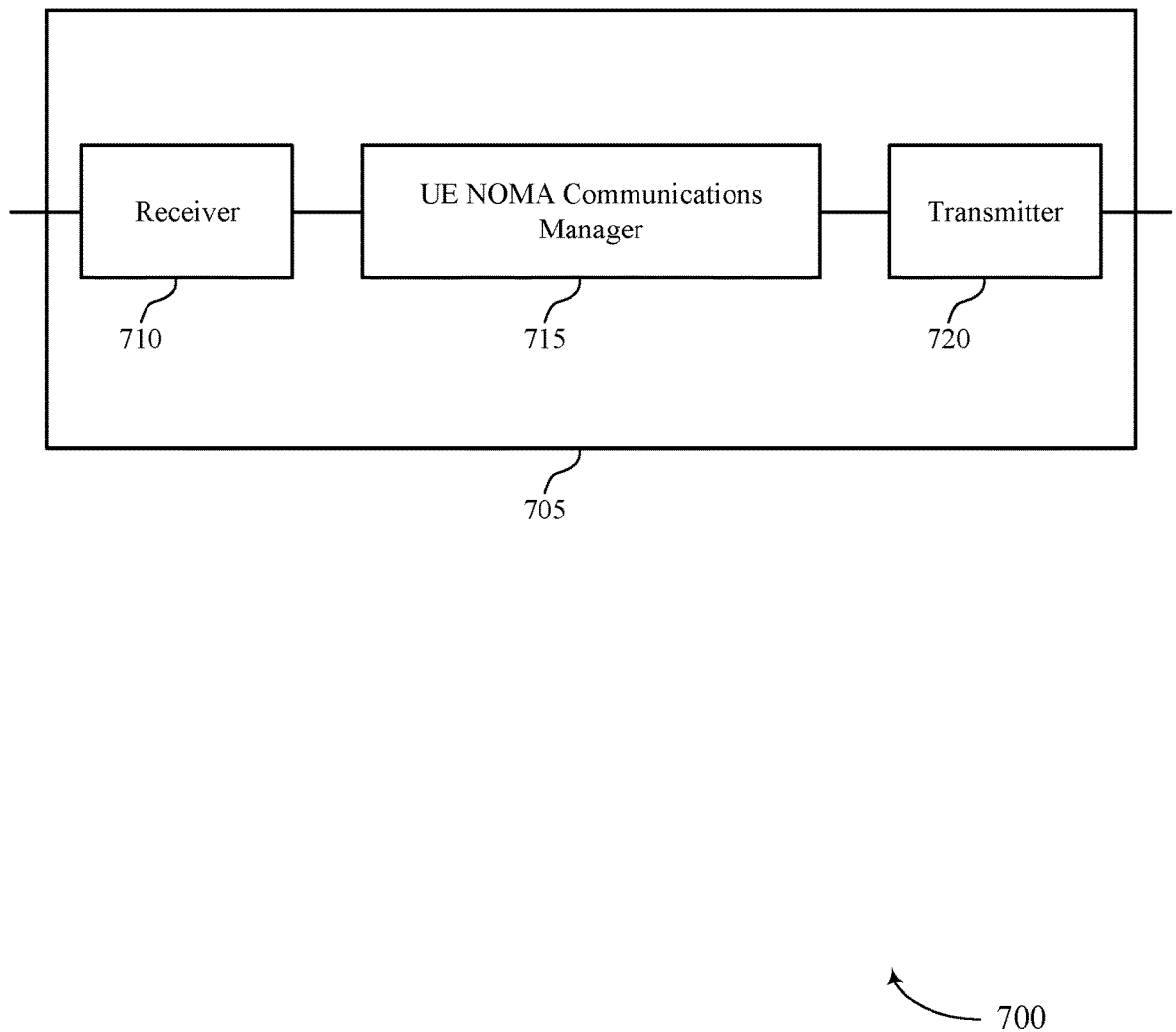
FIGS. 7 and 8 show block diagrams of devices that support UE grouping for uplink NOMA in accordance with aspects of the present disclosure.

FIG. 7 shows a block diagram 700 of a device 705 that supports UE grouping for uplink NOMA in accordance with aspects of the present disclosure. The device 705 may be an example of aspects of a UE 115 as described herein. The device 705 may include a receiver 710, a UE NOMA communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to UE grouping for uplink NOMA, etc.). Information may be passed on to other components of the device 705. The receiver 710 may be an example of aspects of the transceiver 1020 described with reference to FIG. 10. The receiver 710 may utilize a single antenna or a set of antennas.

The UE NOMA communications manager 715 may transmit a capability indication that the UE is capable of performing uplink. In some cases, the UE NOMA communications manager 715 may then receive, from a base station, an assignment that the UE is to be a member of a group of a set of groups of uplink NOMA-capable UEs. Accordingly, the UE NOMA communications manager 715 may transmit one or more uplink NOMA communications to the base station based on the group to which the UE has been assigned. The UE NOMA communications manager 715 may be an example of aspects of the UE NOMA communications manager 1010 described herein.

The UE NOMA communications manager 715, or its sub-components, may be implemented in hardware, code (e.g., software or firmware) executed by a processor, or any combination thereof. If implemented in code executed by a processor, the functions of the UE NOMA communications manager 715, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE NOMA communications manager 715, or its sub-components, may be physically located at various positions, including being distributed such that portions of functions are implemented at different physical locations by one or more physical components. In some examples, the UE NOMA communications manager 715, or its sub-components, may be a separate and distinct component in accordance with various aspects of the present disclosure. In some examples, the UE NOMA communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
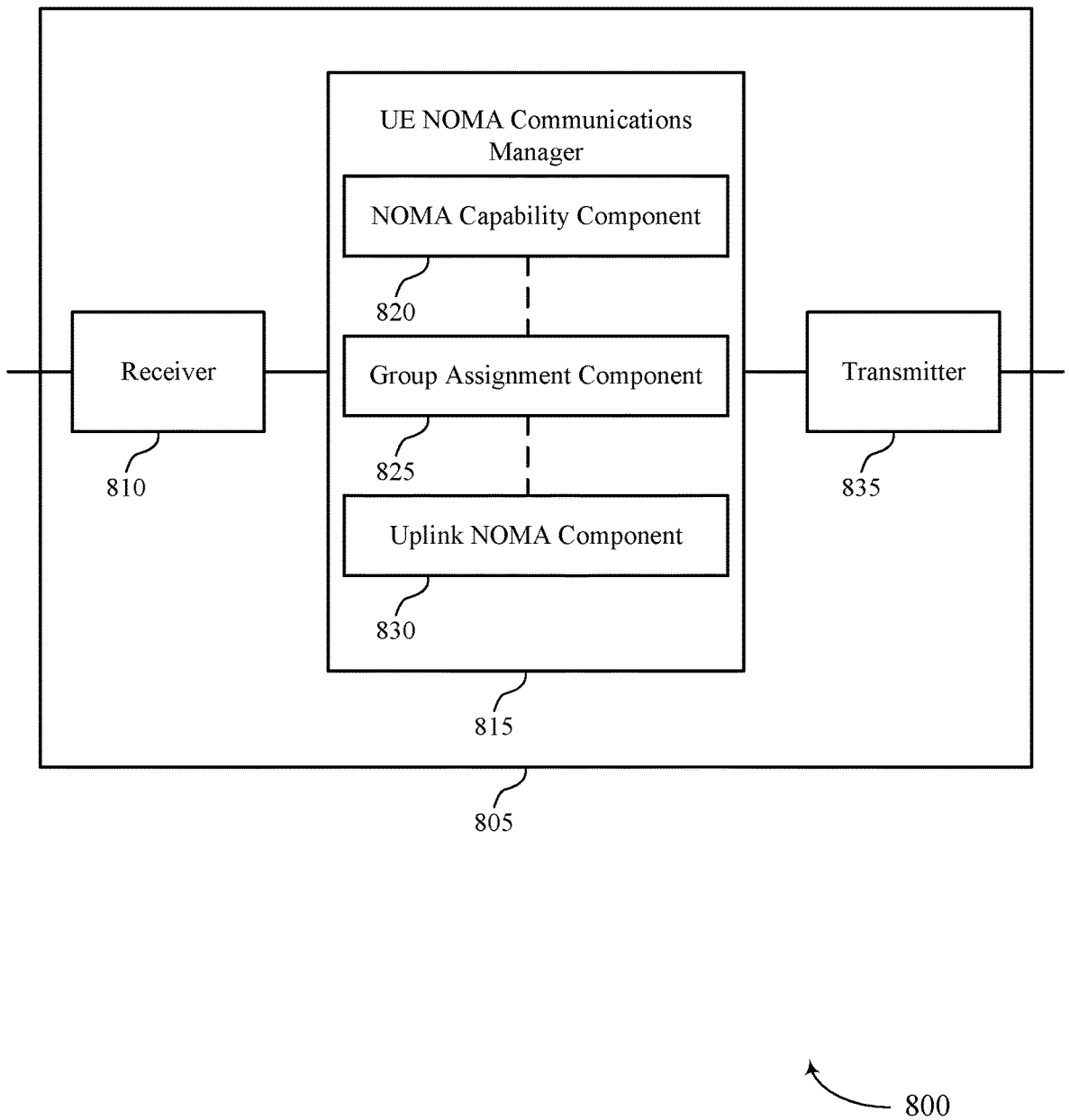

FIG. 8 shows a block diagram 800 of a device 805 that supports UE grouping for uplink NOMA in accordance with aspects of the present disclosure. The device 805 may be an example of aspects of a device 705 or a UE 115 as described herein. The device 805 may include a receiver 810, a UE NOMA communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to UE grouping for uplink NOMA, etc.). Information may be passed on to other components of the device 805. The receiver 810 may be an example of aspects of the transceiver 1020 described with reference to FIG. 10. The receiver 810 may utilize a single antenna or a set of antennas.

The UE NOMA communications manager 815 may be an example of aspects of the UE NOMA communications manager 715 as described herein. The UE NOMA communications manager 815 may include a NOMA capability component 820, a group assignment component 825, and an uplink NOMA component 830. The UE NOMA communications manager 815 may be an example of aspects of the UE NOMA communications manager 1010 described herein.

The NOMA capability component 820 may transmit, by the UE, a capability indication that the UE is capable of performing uplink NOMA.

The group assignment component 825 may receive, from a base station, an assignment that the UE is to be a member of a group of a set of groups of uplink NOMA-capable UEs.

The uplink NOMA component 830 may transmit one or more uplink NOMA communications to the base station based on the group to which the UE has been assigned.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
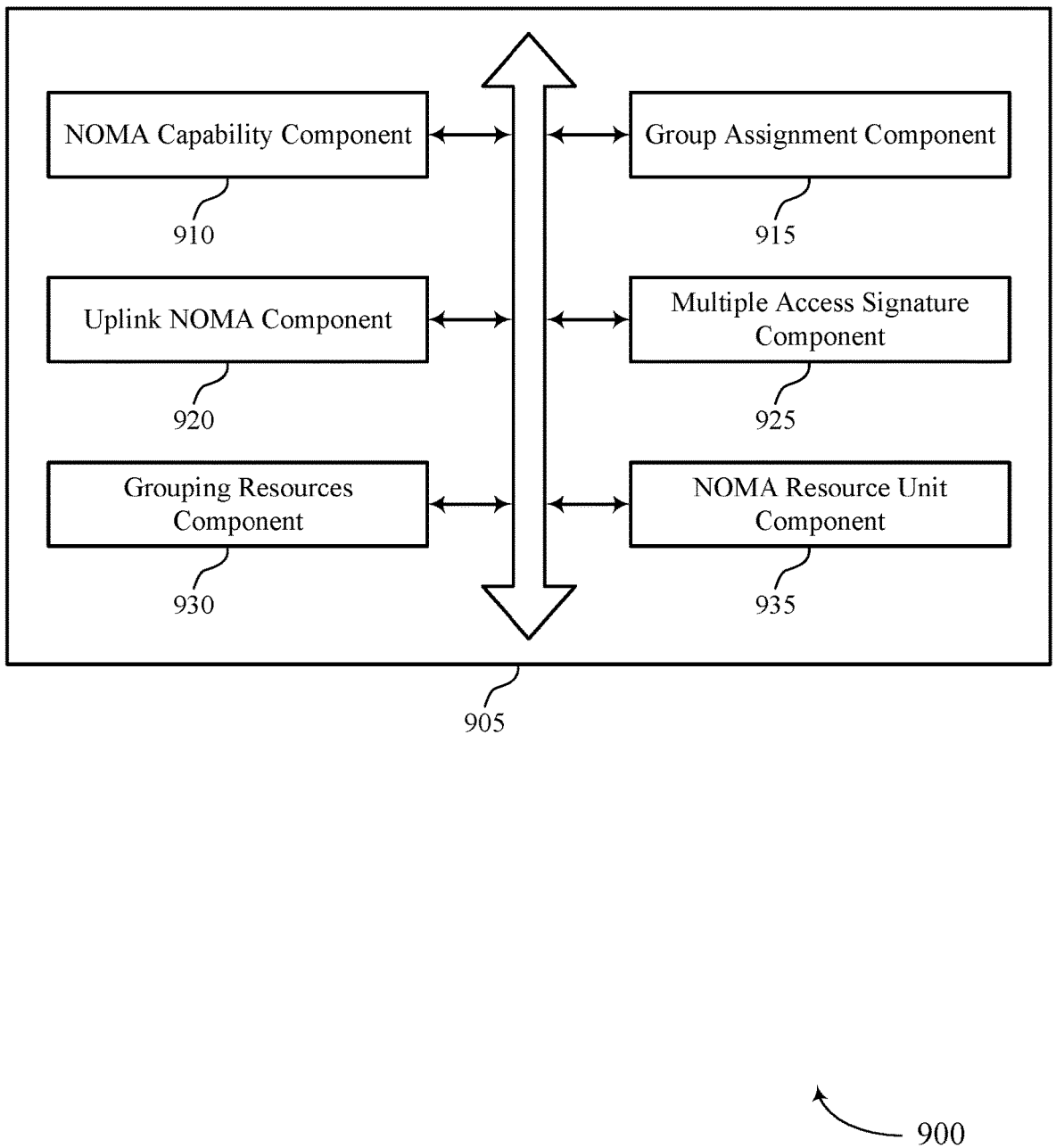
FIG. 9 shows a block diagram of a UE NOMA communications manager that supports UE grouping for uplink NOMA in accordance with aspects of the present disclosure.

FIG. 9 shows a block diagram 900 of a UE NOMA communications manager 905 that supports UE grouping for uplink NOMA in accordance with aspects of the present disclosure. The UE NOMA communications manager 905 may be an example of aspects of a UE NOMA communications manager 715, a UE NOMA communications manager 815, or a UE NOMA communications manager 1010 described herein. The UE NOMA communications manager 905 may include a NOMA capability component 910, a group assignment component 915, an uplink NOMA component 920, a multiple access signature component 925, a grouping resources component 930, and a NOMA resource unit component 935. Each of these modules may communicate, directly or indirectly, with one another (e.g., via one or more buses).

The NOMA capability component 910 may transmit, by the UE, a capability indication that the UE is capable of performing uplink NOMA.

The group assignment component 915 may receive, from a base station, an assignment that the UE is to be a member of a group of a set of groups of uplink NOMA-capable UEs. In some examples, the group assignment component 915 may receive the assignment as a preconfigured assignment via RRC signaling. Additionally or alternatively, the group assignment component 915 may receive the assignment as a dynamically-configured assignment via either a group-common PDCCH message or via RMSI. Additionally or alternatively, the group assignment component 915 may receive the assignment via UE-specific dynamic DCI.

In some cases, a number of the set of groups of uplink NOMA-capable UEs may be based on a total number of uplink NOMA-capable UEs in communication with the base station and a number of orthogonal or quasi-orthogonal MA signatures supported by the total number of uplink NOMA-capable UEs. Additionally, the orthogonal or quasi-orthogonal MA signatures may vary by spreading codes, scrambling codes, permutation patterns, sparsity patterns, or combinations thereof.

The uplink NOMA component 920 may transmit one or more uplink NOMA communications to the base station based on the group to which the UE has been assigned.

The multiple access signature component 925 may receive a group-specific indication that the UE is to apply a group-specific scrambling code to the one or more uplink NOMA communications. Additionally, the multiple access signature component 925 may receive a group-specific indication that the UE is to apply a group-specific power control for transmission of the one or more uplink NOMA communications. In some cases, the group-specific power control may include a target receive power range associated with the group.

The grouping resources component 930 may receive a group-specific indication that the UE is to use specific time and frequency resources for transmission of the one or more uplink NOMA communications. Accordingly, the specific time and frequency resources indicated to the UE by the group-specific indication may either differ completely or partially with time and frequency resources assigned to other groups of the set of groups of uplink NOMA-capable UEs. In some cases, a degree of overlap between the specific time and frequency resources indicated to the UE by the group-specific indication and time and frequency resources assigned to other groups of the set of groups of uplink NOMA-capable UEs may be preconfigured. Additionally or alternatively, a degree of overlap between the specific time and frequency resources indicated to the UE by the group-specific indication and time and frequency resources assigned to other groups of the set of groups of uplink NOMA-capable UEs is based on a quality of service capability associated with the uplink NOMA-capable UEs.

In some cases, the specific time and frequency resources indicated to the UE by the group-specific indication may represent a fraction of total time and frequency resources assigned to the set of groups of uplink NOMA-capable UEs, with at least some groups being assigned different fractions. Additionally, a number of uplink NOMA-capable UEs in the group differs from a number of uplink NOMA-capable UEs in at least one other of the set of groups.

In some cases, the specific time and frequency resources may be defined by one or more NOMA resource units, each NOMA resource unit occupying a predefined number of OFDM symbols and a predefined number of PRBs or sub-PRBs. The predefined number of sub-PRBs may be a fraction of tones of a single PRB. Additionally or alternatively, the predefined number of sub-PRBs may include consecutive or non-consecutive tones of a single PRB. In some cases, at least one of the predefined number of OFDM symbols or the predefined number of PRBs or sub-PRBs may be based on a system numerology and a capability of the uplink NOMA-capable UEs.

The NOMA resource unit component 935 may receive a NOMA resource unit indication indicating the predefined number of OFDM symbols and the predefined number of PRBs or sub-PRBs.

Figure 10:
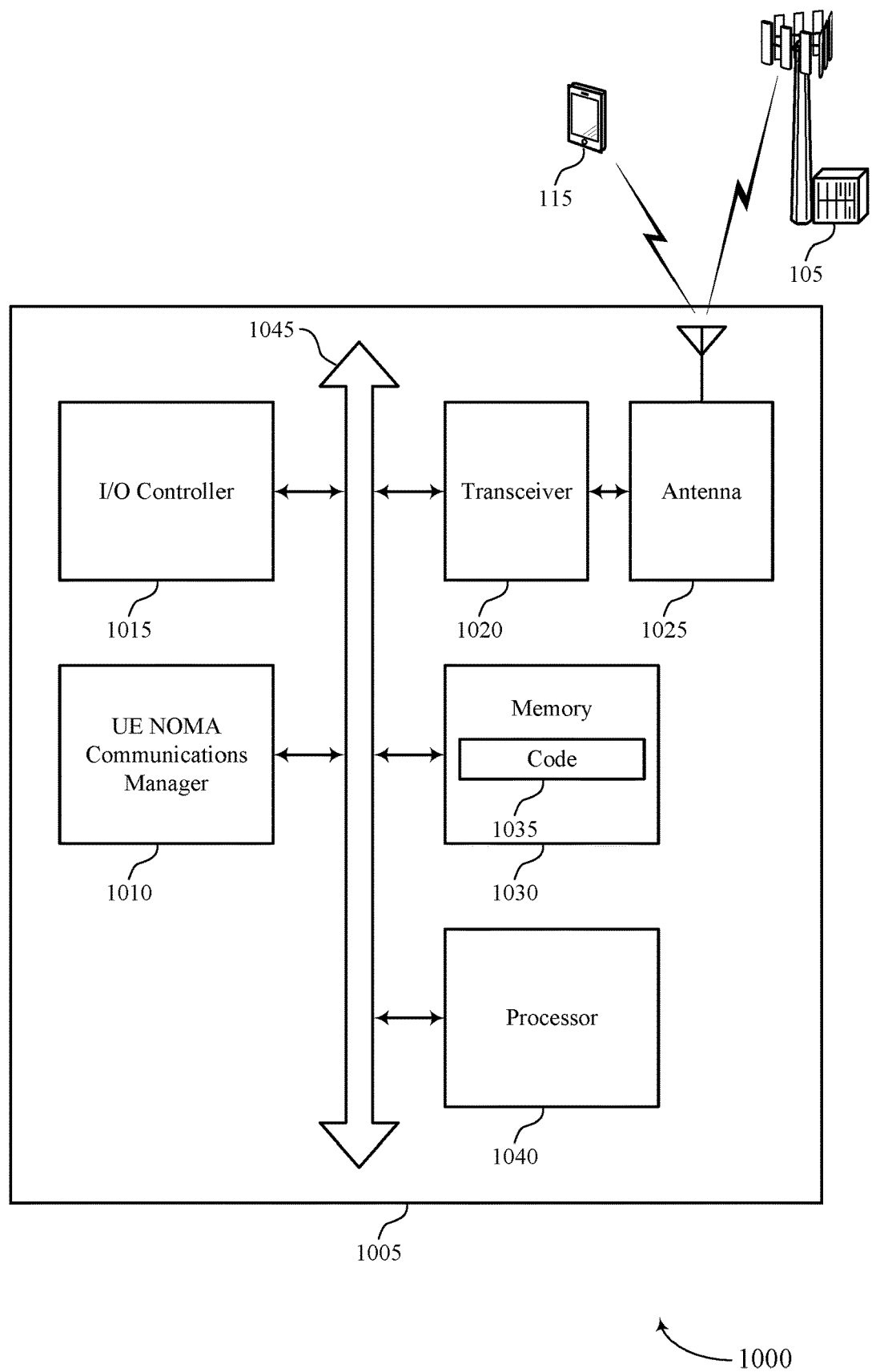
FIG. 10 shows a diagram of a system including a device that supports UE grouping for uplink NOMA in accordance with aspects of the present disclosure.

FIG. 10 shows a diagram of a system 1000 including a device 1005 that supports UE grouping for uplink NOMA in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE NOMA communications manager 1010, an I/O controller 1015, a transceiver 1020, an antenna 1025, memory 1030, and a processor 1040. These components may be in electronic communication via one or more buses (e.g., bus 1045).

The UE NOMA communications manager 1010 may transmit a capability indication that the UE is capable of performing uplink NOMA. In some cases, the UE NOMA communications manager 1010 may receive, from a base station, an assignment that the UE is to be a member of a group of a set of groups of uplink NOMA-capable UEs. Accordingly, the UE NOMA communications manager 1010 may transmit one or more uplink NOMA communications to the base station based on the group to which the UE has been assigned.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOSED, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting UE grouping for uplink NOMA).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
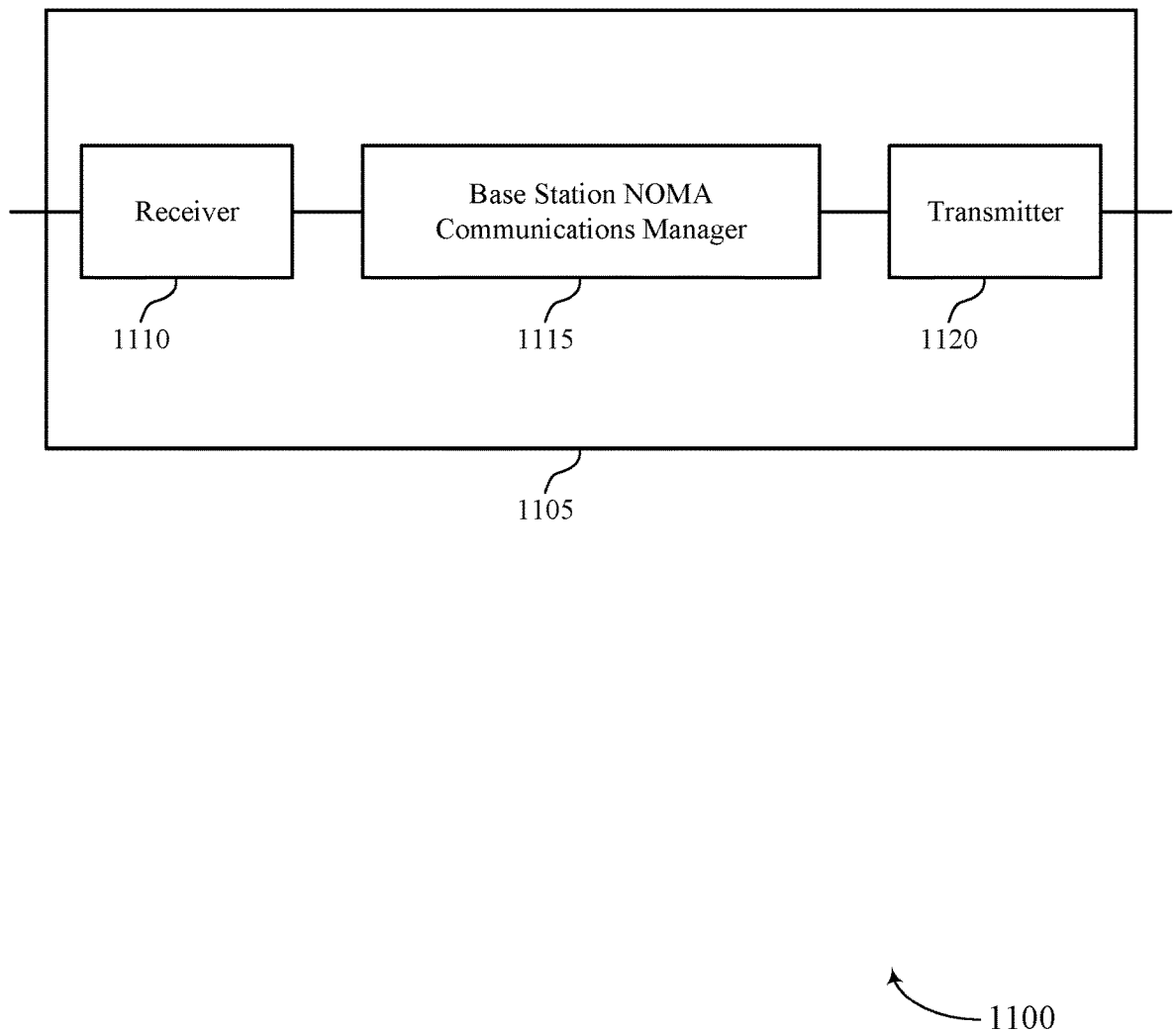
FIGS. 11 and 12 show block diagrams of devices that support UE grouping for uplink NOMA in accordance with aspects of the present disclosure.

FIG. 11 shows a block diagram 1100 of a device 1105 that supports UE grouping for uplink NOMA in accordance with aspects of the present disclosure. The device 1105 may be an example of aspects of a base station 105 as described herein. The device 1105 may include a receiver 1110, a base station NOMA communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to UE grouping for uplink NOMA, etc.). Information may be passed on to other components of the device 1105. The receiver 1110 may be an example of aspects of the transceiver 1420 described with reference to FIG. 14. The receiver 1110 may utilize a single antenna or a set of antennas.

The base station NOMA communications manager 1115 may receive, from a set of UEs, a corresponding set of capability indications that each UE of the set of UEs is capable of performing uplink NOMA. Accordingly, the base station NOMA communications manager 1115 may transmit an assignment to at least one UE of the set of UEs that the UE is to be a member of a group of a set of groups of uplink NOMA-capable UEs. In some cases, the base station NOMA communications manager 1115 may receive one or more uplink NOMA communications from the UE based on the group to which the UE has been assigned. The base station NOMA communications manager 1115 may be an example of aspects of the base station NOMA communications manager 1410 described herein.

The base station NOMA communications manager 1115, or its sub-components, may be implemented in hardware, code (e.g., software or firmware) executed by a processor, or any combination thereof. If implemented in code executed by a processor, the functions of the base station NOMA communications manager 1115, or its sub-components may be executed by a general-purpose processor, a DSP, an ASIC, an FPGA or other PLD, discrete gate or transistor logic, discrete hardware components, or any combination thereof designed to perform the functions described in the present disclosure.

The base station NOMA communications manager 1115, or its sub-components, may be physically located at various positions, including being distributed such that portions of functions are implemented at different physical locations by one or more physical components. In some examples, the base station NOMA communications manager 1115, or its sub-components, may be a separate and distinct component in accordance with various aspects of the present disclosure. In some examples, the base station NOMA communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
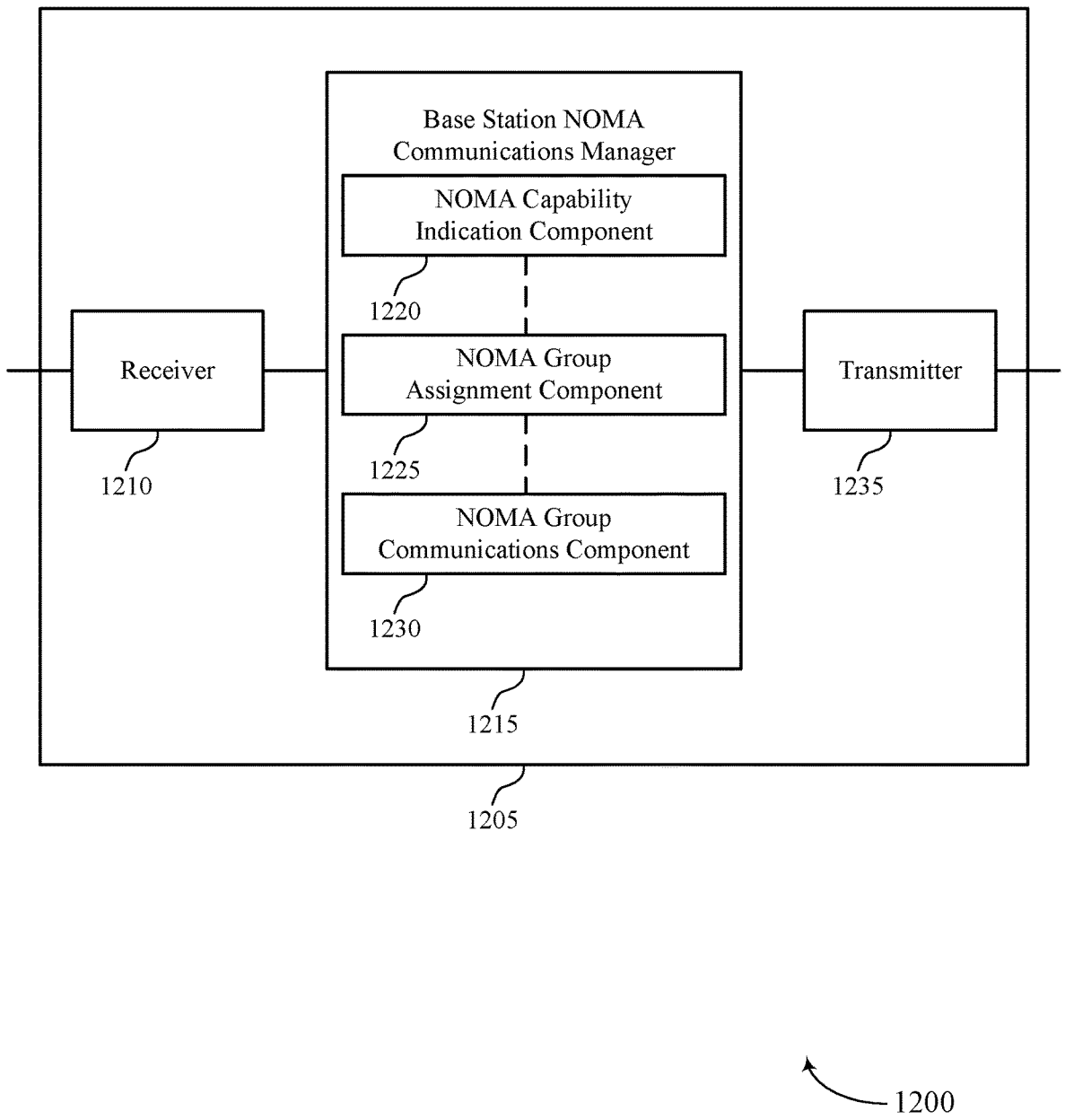

FIG. 12 shows a block diagram 1200 of a device 1205 that supports UE grouping for uplink NOMA in accordance with aspects of the present disclosure. The device 1205 may be an example of aspects of a device 1105 or a base station 115 as described herein. The device 1205 may include a receiver 1210, a base station NOMA communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to UE grouping for uplink NOMA, etc.). Information may be passed on to other components of the device 1205. The receiver 1210 may be an example of aspects of the transceiver 1420 described with reference to FIG. 14. The receiver 1210 may utilize a single antenna or a set of antennas.

The base station NOMA communications manager 1215 may be an example of aspects of the base station NOMA communications manager 1115 as described herein. The base station NOMA communications manager 1215 may include a NOMA capability indication component 1220, a NOMA group assignment component 1225, and a NOMA group communications component 1230. The base station NOMA communications manager 1215 may be an example of aspects of the base station NOMA communications manager 1410 described herein.

The NOMA capability indication component 1220 may receive, from a set of UEs, a corresponding set of capability indications that each UE of the set of UEs is capable of performing uplink NOMA.

The NOMA group assignment component 1225 may transmit an assignment to at least one UE of the set of UEs that the UE is to be a member of a group of a set of groups of uplink NOMA-capable UEs.

The NOMA group communications component 1230 may receive one or more uplink NOMA communications from the UE based on the group to which the UE has been assigned.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
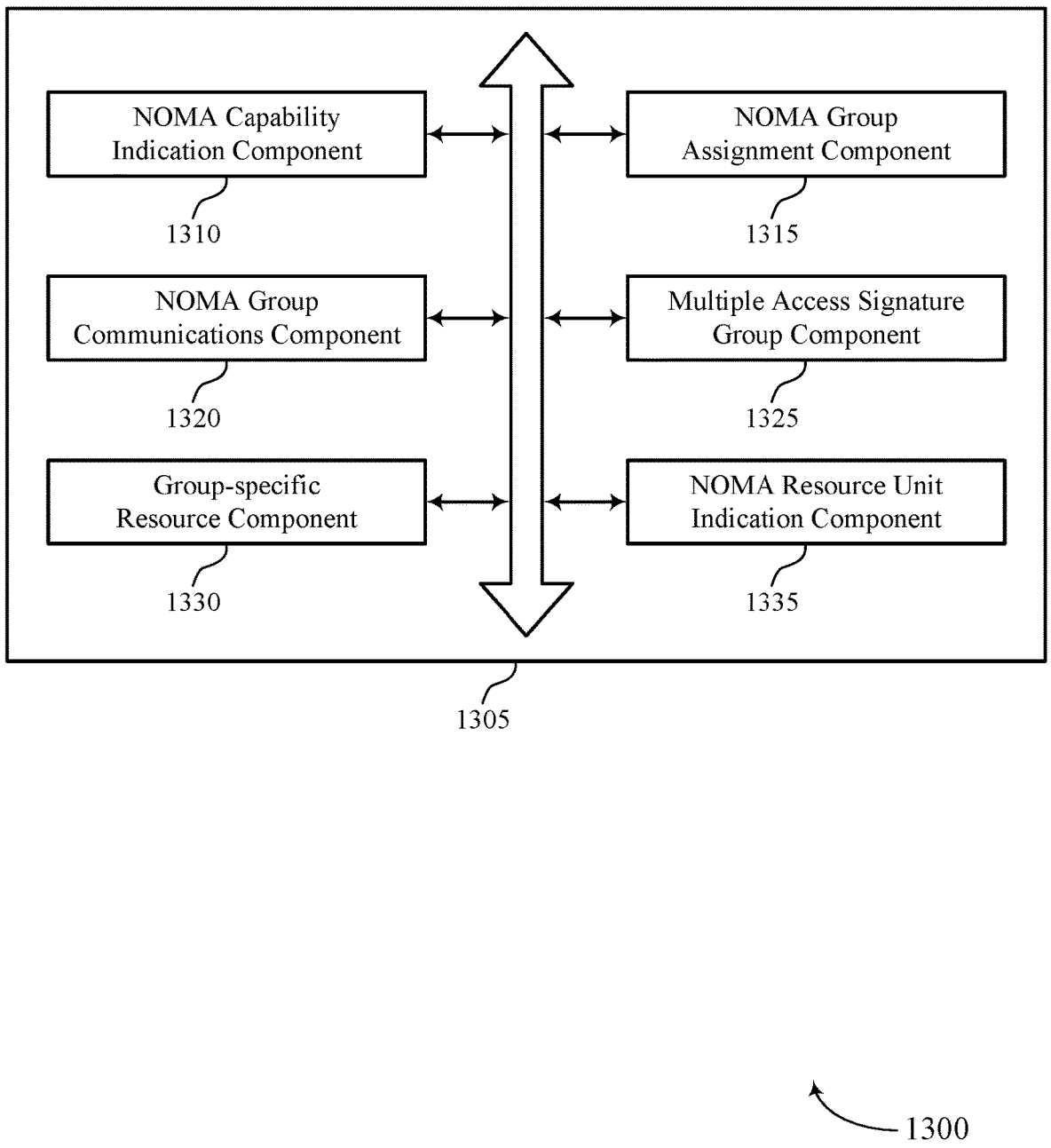
FIG. 13 shows a block diagram of a base station NOMA communications manager that supports UE grouping for uplink NOMA in accordance with aspects of the present disclosure.

FIG. 13 shows a block diagram 1300 of a base station NOMA communications manager 1305 that supports UE grouping for uplink NOMA in accordance with aspects of the present disclosure. The base station NOMA communications manager 1305 may be an example of aspects of a base station NOMA communications manager 1115, a base station NOMA communications manager 1215, or a base station NOMA communications manager 1410 described herein. The base station NOMA communications manager 1305 may include a NOMA capability indication component 1310, a NOMA group assignment component 1315, a NOMA group communications component 1320, a multiple access signature group component 1325, a group-specific resource component 1330, and a NOMA resource unit indication component 1335. Each of these modules may communicate, directly or indirectly, with one another (e.g., via one or more buses).

The NOMA capability indication component 1310 may receive, from a set of UEs, a corresponding set of capability indications that each UE of the set of UEs is capable of performing uplink NOMA.

The NOMA group assignment component 1315 may transmit an assignment to at least one UE of the set of UEs that the UE is to be a member of a group of a set of groups of uplink NOMA-capable UEs. In some examples, the NOMA group assignment component 1315 may transmit the assignment as a preconfigured assignment via RRC signaling. Additionally or alternatively, the NOMA group assignment component 1315 may transmit the assignment as a dynamically-configured assignment via either a group-common PDCCH message or via RMSI. Additionally or alternatively, the NOMA group assignment component 1315 may transmit the assignment via UE-specific dynamic DCI.

In some cases, a number of the set of groups of uplink NOMA-capable UEs may be based on a total number of uplink NOMA-capable UEs in communication with the base station and a number of orthogonal or quasi-orthogonal MA signatures supported by the total number of uplink NOMA-capable UEs. Additionally, the orthogonal or quasi-orthogonal MA signatures may vary by spreading codes, scrambling codes, permutation patterns, sparsity patterns, or combinations thereof.

The NOMA group communications component 1320 may receive one or more uplink NOMA communications from the UE based on the group to which the UE has been assigned.

The multiple access signature group component 1325 may transmit a group-specific indication that the UE is to apply a group-specific scrambling code to the one or more uplink NOMA communications. Additionally, the multiple access signature group component 1325 may transmit a group-specific indication that the UE is to apply a group-specific power control for transmission of the one or more uplink NOMA communications. In some cases, the group-specific power control may include a target receive power range associated with the group.

The group-specific resource component 1330 may transmit a group-specific indication that the UE is to use specific time and frequency resources for transmission of the one or more uplink NOMA communications. Accordingly, the specific time and frequency resources indicated to the UE by the group-specific indication may either differ completely or partially with time and frequency resources assigned to other groups of the set of groups of uplink NOMA-capable UEs. In some cases, a degree of overlap between the specific time and frequency resources indicated to the UE by the group-specific indication and time and frequency resources assigned to other groups of the set of groups of uplink NOMA-capable UEs is preconfigured. Additionally or alternatively, the group-specific resource component 1330 may determine a degree of overlap between the specific time and frequency resources indicated to the UE by the group-specific indication and time and frequency resources assigned to other groups of the set of groups of uplink NOMA-capable UEs based on a quality of service capability associated with the uplink NOMA-capable UEs.

In some cases, the specific time and frequency resources indicated to the UE by the group-specific indication may represent a fraction of total time and frequency resources assigned to the set of groups of uplink NOMA-capable UEs, with at least some groups being assigned different fractions. Additionally, a number of uplink NOMA-capable UEs in the group differs from a number of uplink NOMA-capable UEs in at least one other of the set of groups.

In some cases, the specific time and frequency resources are defined by one or more NOMA resource units, each NOMA resource unit occupying a predefined number of OFDM symbols and a predefined number of PRBs or sub-PRBs. The predefined number of sub-PRBs is a fraction of tones of a single PRB. Additionally or alternatively, the predefined number of sub-PRBs includes consecutive or non-consecutive tones of a single PRB. In some cases, at least one of the predefined number of OFDM symbols or the predefined number of PRBs or sub-PRBs is based on a system numerology and a capability of the uplink NOMA-capable UEs.

The NOMA resource unit indication component 1335 may transmit a NOMA resource unit indication indicating the predefined number of OFDM symbols and the predefined number of PRBs or sub-PRBs.

Figure 14:
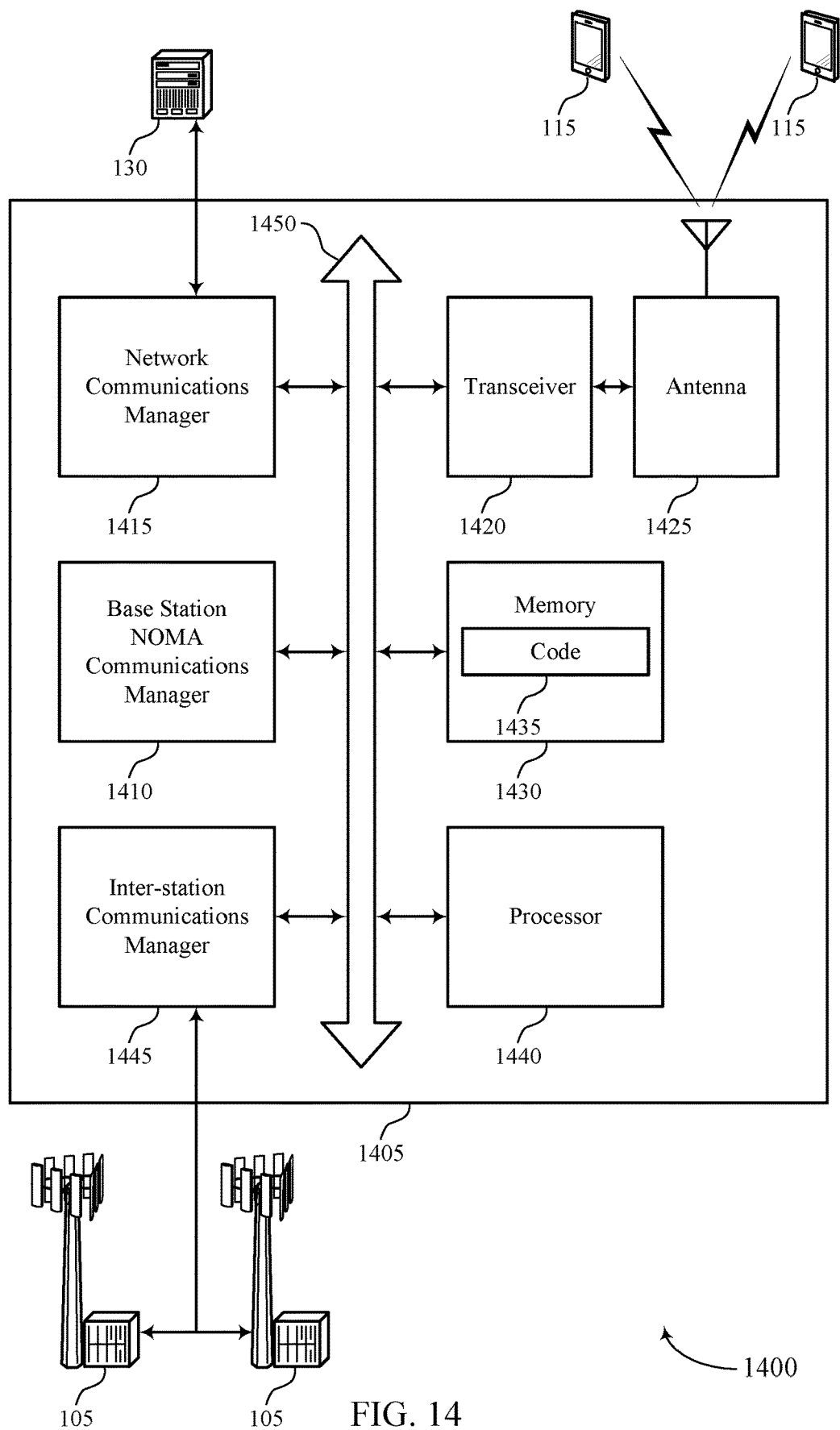
FIG. 14 shows a diagram of a system including a device that supports UE grouping for uplink NOMA in accordance with aspects of the present disclosure.

FIG. 14 shows a diagram of a system 1400 including a device 1405 that supports UE grouping for uplink NOMA in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station NOMA communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station NOMA communications manager 1410 may receive, from a set of UEs, a corresponding set of capability indications that each UE of the set of UEs is capable of performing uplink NOMA. Accordingly, the base station NOMA communications manager 1410 may transmit an assignment to at least one UE of the set of UEs that the UE is to be a member of a group of a set of groups of uplink NOMA-capable UEs. In some cases, the base station NOMA communications manager 1410 may receive one or more uplink NOMA communications from the UE based on the group to which the UE has been assigned.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device #{device} to perform various functions (e.g., functions or tasks supporting UE grouping for uplink NOMA).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
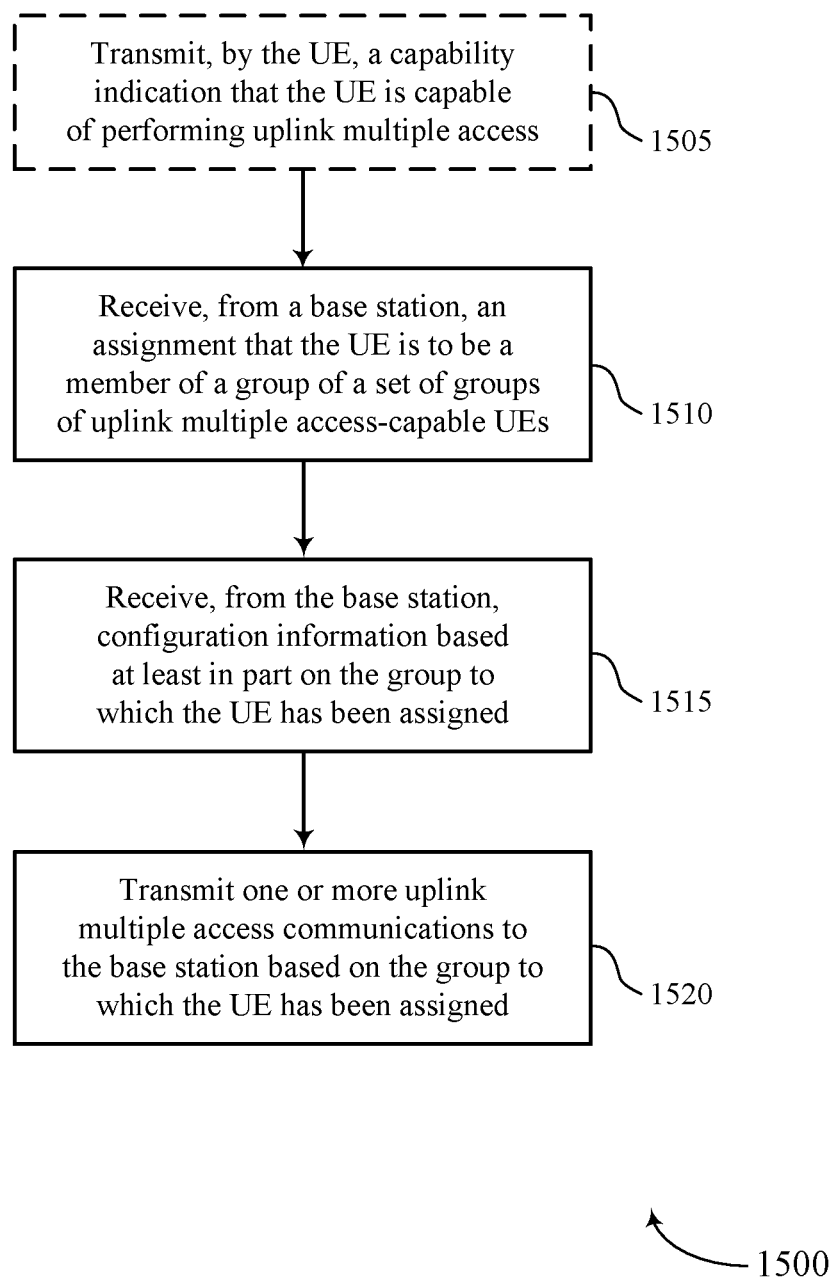
FIGS. 15-21 show flowcharts illustrating methods that support UE grouping for uplink NOMA in accordance with aspects of the present disclosure.

FIG. 15 shows a flowchart illustrating a method 1500 that supports UE grouping for uplink multiple access in accordance with aspects of the present disclosure. The operations of method 1500 may be implemented by a UE 115 or its components as described herein. For example, the operations of method 1500 may be performed by a UE multiple access communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may transmit, by the UE, a capability indication that the UE is capable of performing uplink multiple access. The operations of 1505 may be performed according to the methods described herein. In some examples, aspects of the operations of 1505 may be performed by a multiple access capability component as described with reference to FIGS. 7 through 10. In some examples, the UE may optionally transmit the capability indication. In some examples, the UE does not transmit the capability indication.

At 1510, the UE may receive, from a base station, an assignment that the UE is to be a member of a group of a set of groups of uplink multiple access-capable UEs. The operations of 1510 may be performed according to the methods described herein. In some examples, aspects of the operations of 1510 may be performed by a group assignment component as described with reference to FIGS. 7 through 10.

At 1515, the UE may receive, from the base station, configuration information based at least in part on the group to which the UE has been assigned. The operations of 1515 may be performed according to the methods described herein. In some examples, aspects of the operations of 1515 may be performed by an uplink multiple access component as described with reference to FIGS. 7 through 10.

At 1520, the UE may transmit one or more uplink multiple access communications to the base station based on the group to which the UE has been assigned. In some examples, the one or more uplink access communications may be part of the configuration information. The operations of 1520 may be performed according to the methods described herein. In some examples, aspects of the operations of 1520 may be performed by an uplink multiple access component as described with reference to FIGS. 7 through 10.

Figure 16:
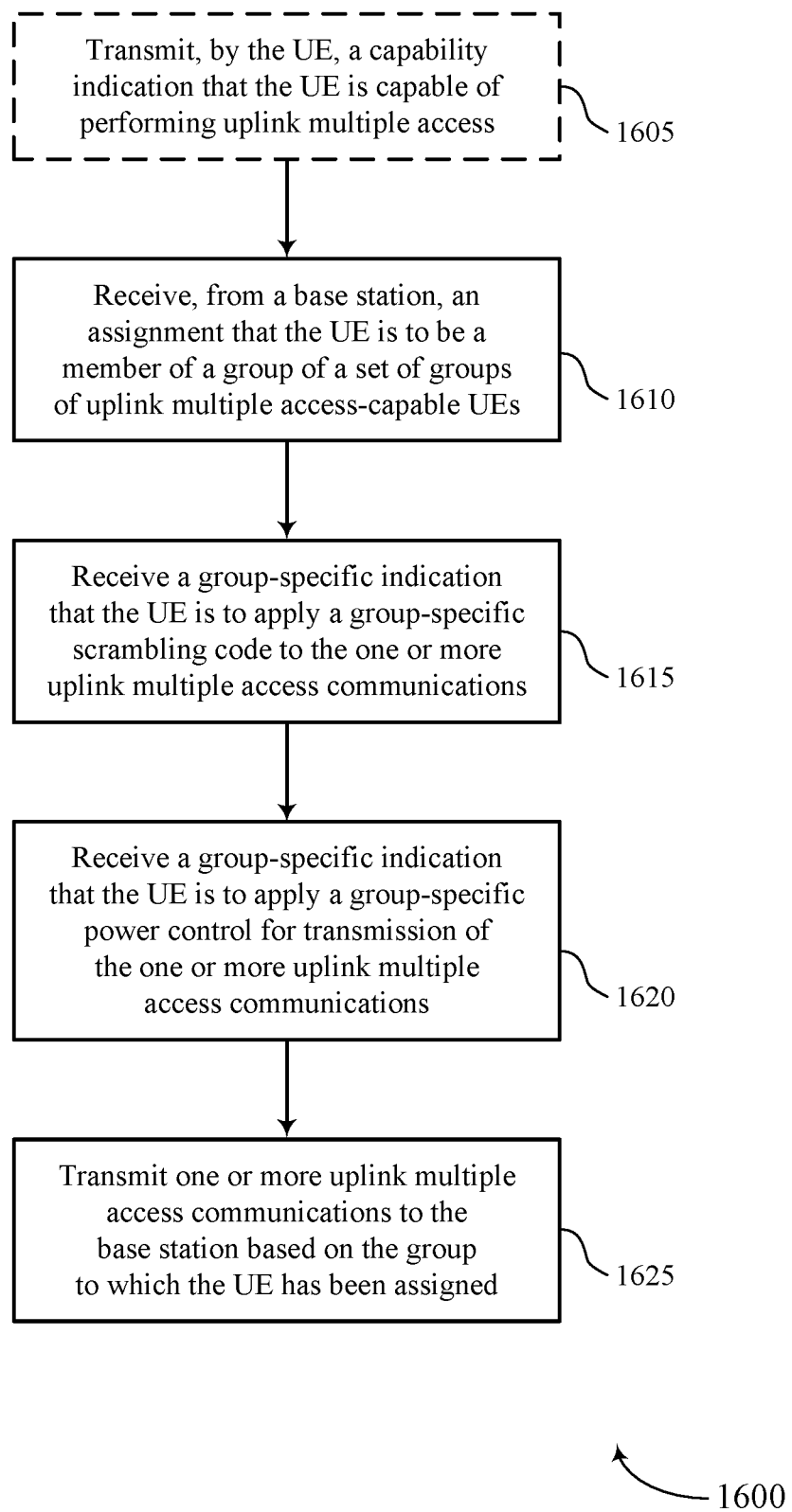

FIG. 16 shows a flowchart illustrating a method 1600 that supports UE grouping for uplink multiple access in accordance with aspects of the present disclosure. The operations of method 1600 may be implemented by a UE 115 or its components as described herein. For example, the operations of method 1600 may be performed by a UE multiple access communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may transmit, by the UE, a capability indication that the UE is capable of performing uplink multiple access. The operations of 1605 may be performed according to the methods described herein. In some examples, aspects of the operations of 1605 may be performed by a multiple access capability component as described with reference to FIGS. 7 through 10. In some examples, the UE may optionally transmit the capability indication. In some examples, the UE does not transmit the capability indication.

At 1610, the UE may receive, from a base station, an assignment that the UE is to be a member of a group of a set of groups of uplink multiple access-capable UEs. The operations of 1610 may be performed according to the methods described herein. In some examples, aspects of the operations of 1610 may be performed by a group assignment component as described with reference to FIGS. 7 through 10.

At 1615, the UE may receive a group-specific indication that the UE is to apply a group-specific scrambling code to the one or more uplink multiple access communications. In some examples, receiving the group-specific indication that the UE is to apply the group-specific scrambling code may be received as part of the configuration information received at the UE from the base station. The operations of 1615 may be performed according to the methods described herein. In some examples, aspects of the operations of 1615 may be performed by a multiple access signature component as described with reference to FIGS. 7 through 10.

At 1620, the UE may receive a group-specific indication that the UE is to apply a group-specific power control for transmission of the one or more uplink multiple access communications. In some examples, receiving the group-specific indication that the UE is to apply the group-specific power control may be received as part of the configuration information received at the UE from the base station. The operations of 1620 may be performed according to the methods described herein. In some examples, aspects of the operations of 1620 may be performed by a multiple access signature component as described with reference to FIGS. 7 through 10.

At 1625, the UE may transmit one or more uplink multiple access communications to the base station based on the group to which the UE has been assigned. The operations of 1625 may be performed according to the methods described herein. In some examples, aspects of the operations of 1625 may be performed by an uplink multiple access component as described with reference to FIGS. 7 through 10.

Figure 17:
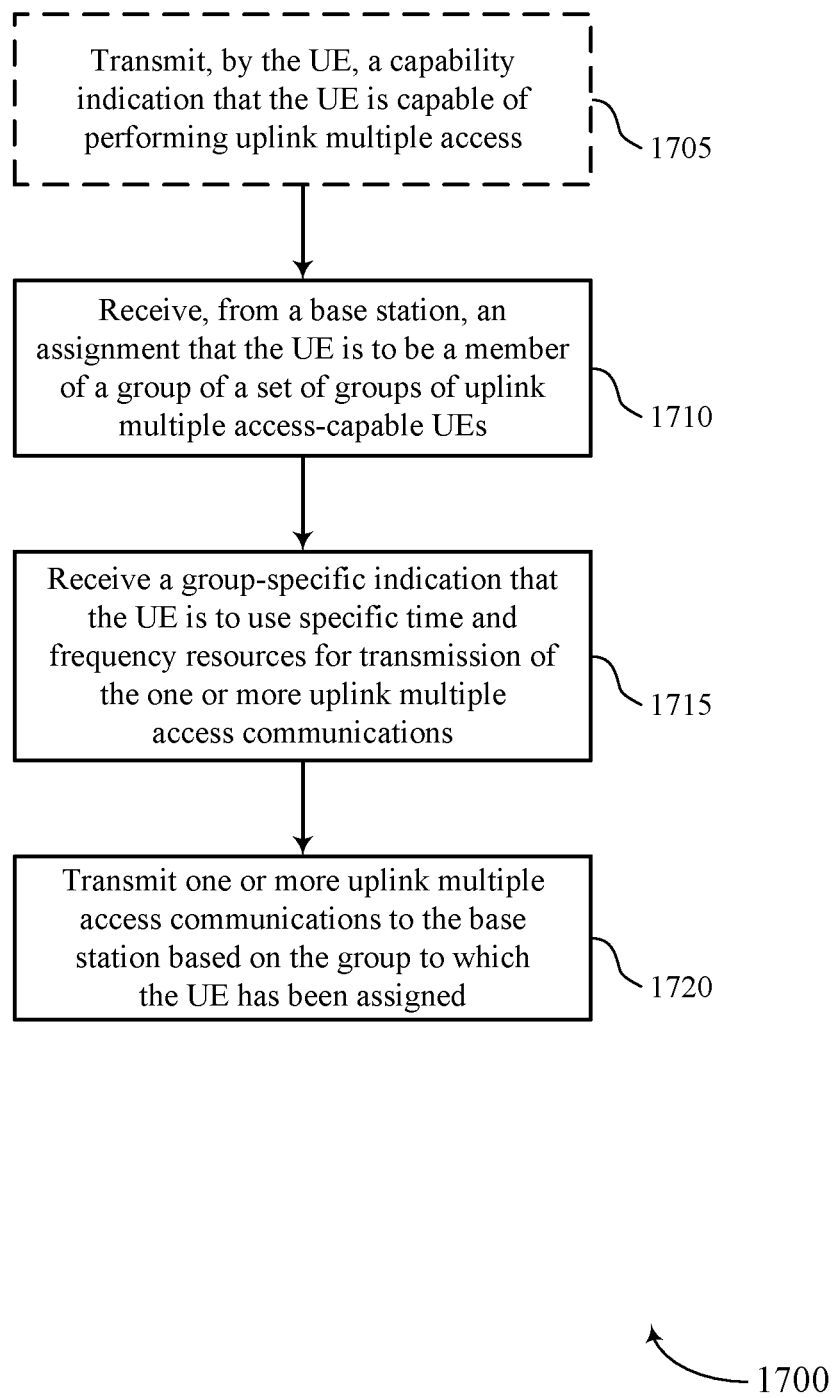

FIG. 17 shows a flowchart illustrating a method 1700 that supports UE grouping for uplink multiple access in accordance with aspects of the present disclosure. The operations of method 1700 may be implemented by a UE 115 or its components as described herein. For example, the operations of method 1700 may be performed by a UE multiple access communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may transmit, by the UE, a capability indication that the UE is capable of performing uplink multiple access. The operations of 1705 may be performed according to the methods described herein. In some examples, aspects of the operations of 1705 may be performed by a multiple access capability component as described with reference to FIGS. 7 through 10. In some examples, the UE may optionally transmit the capability indication. In some examples, the UE does not transmit the capability indication.

At 1710, the UE may receive, from a base station, an assignment that the UE is to be a member of a group of a set of groups of uplink multiple access-capable UEs. The operations of 1710 may be performed according to the methods described herein. In some examples, aspects of the operations of 1710 may be performed by a group assignment component as described with reference to FIGS. 7 through 10.

At 1715, the UE may receive a group-specific indication that the UE is to use specific time and frequency resources for transmission of the one or more uplink multiple access communications. In some examples, receiving the group-specific indication that the UE is to use specific time and frequency resources for transmission may be received as part of the configuration information received at the UE from the base station. The operations of 1715 may be performed according to the methods described herein. In some examples, aspects of the operations of 1715 may be performed by a grouping resources component as described with reference to FIGS. 7 through 10.

At 1720, the UE may transmit one or more uplink multiple access communications to the base station based on the group to which the UE has been assigned. The operations of 1720 may be performed according to the methods described herein. In some examples, aspects of the operations of 1720 may be performed by an uplink multiple access component as described with reference to FIGS. 7 through 10.

Figure 18:
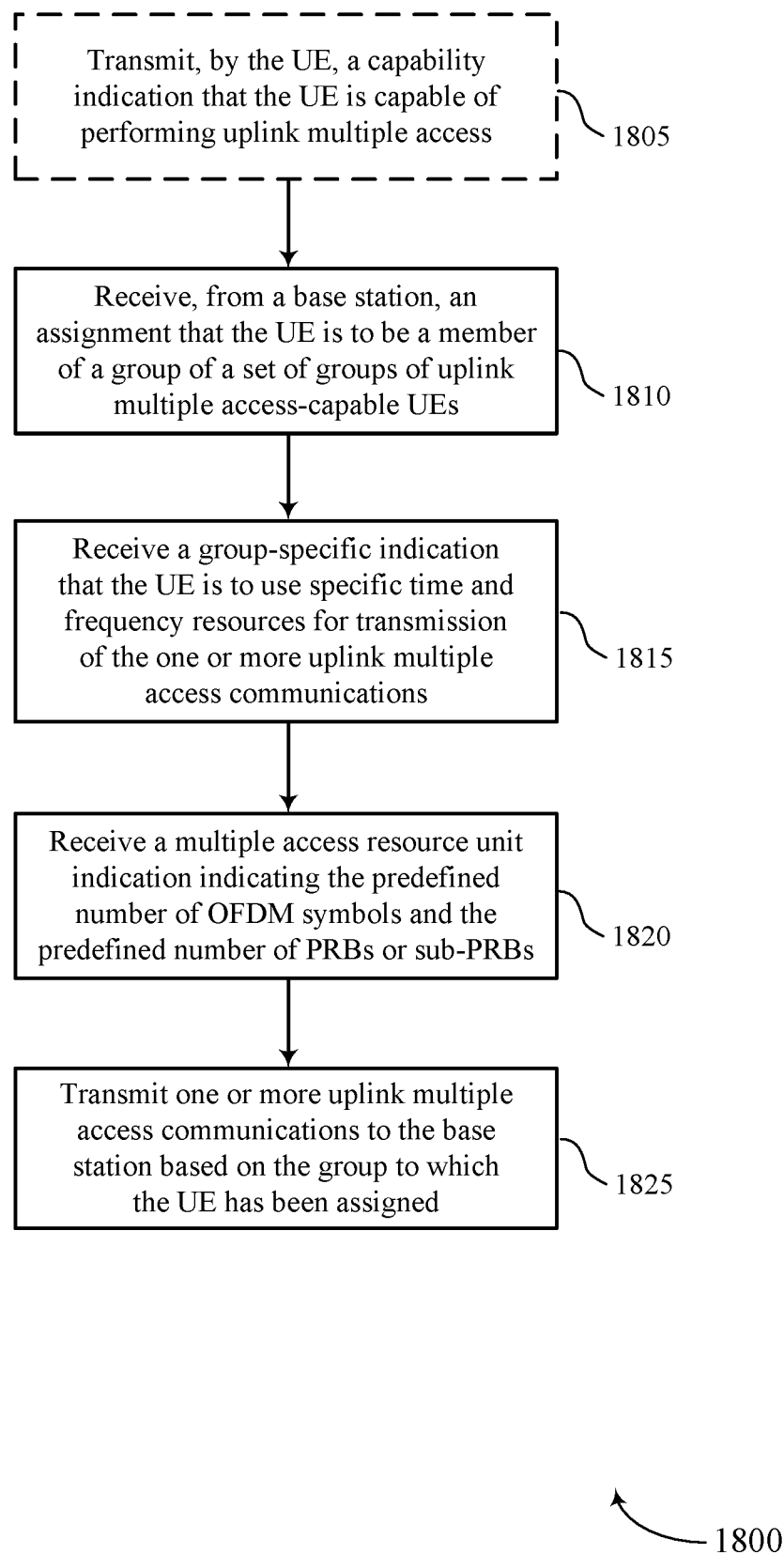

FIG. 18 shows a flowchart illustrating a method 1800 that supports UE grouping for uplink multiple access in accordance with aspects of the present disclosure. The operations of method 1800 may be implemented by a UE 115 or its components as described herein. For example, the operations of method 1800 may be performed by a UE multiple access communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may transmit, by the UE, a capability indication that the UE is capable of performing uplink multiple access. The operations of 1805 may be performed according to the methods described herein. In some examples, aspects of the operations of 1805 may be performed by a multiple access capability component as described with reference to FIGS. 7 through 10.

At 1810, the UE may receive, from a base station, an assignment that the UE is to be a member of a group of a set of groups of uplink multiple access-capable UEs. The operations of 1810 may be performed according to the methods described herein. In some examples, aspects of the operations of 1810 may be performed by a group assignment component as described with reference to FIGS. 7 through 10.

At 1815, the UE may receive a group-specific indication that the UE is to use specific time and frequency resources for transmission of the one or more uplink multiple access communications. In some cases, the specific time and frequency resources are defined by one or more multiple access resource units, each multiple access resource unit occupying a predefined number of OFDM symbols and a predefined number of PRBs or sub-PRBs. The operations of 1815 may be performed according to the methods described herein. In some examples, aspects of the operations of 1815 may be performed by a grouping resources component as described with reference to FIGS. 7 through 10.

At 1820, the UE may receive a multiple access resource unit indication indicating the predefined number of OFDM symbols and the predefined number of PRBs or sub-PRBs. The operations of 1820 may be performed according to the methods described herein. In some examples, aspects of the operations of 1820 may be performed by a multiple access resource unit component as described with reference to FIGS. 7 through 10.

At 1825, the UE may transmit one or more uplink multiple access communications to the base station based on the group to which the UE has been assigned. The operations of 1825 may be performed according to the methods described herein. In some examples, aspects of the operations of 1825 may be performed by an uplink multiple access component as described with reference to FIGS. 7 through 10.

Figure 19:
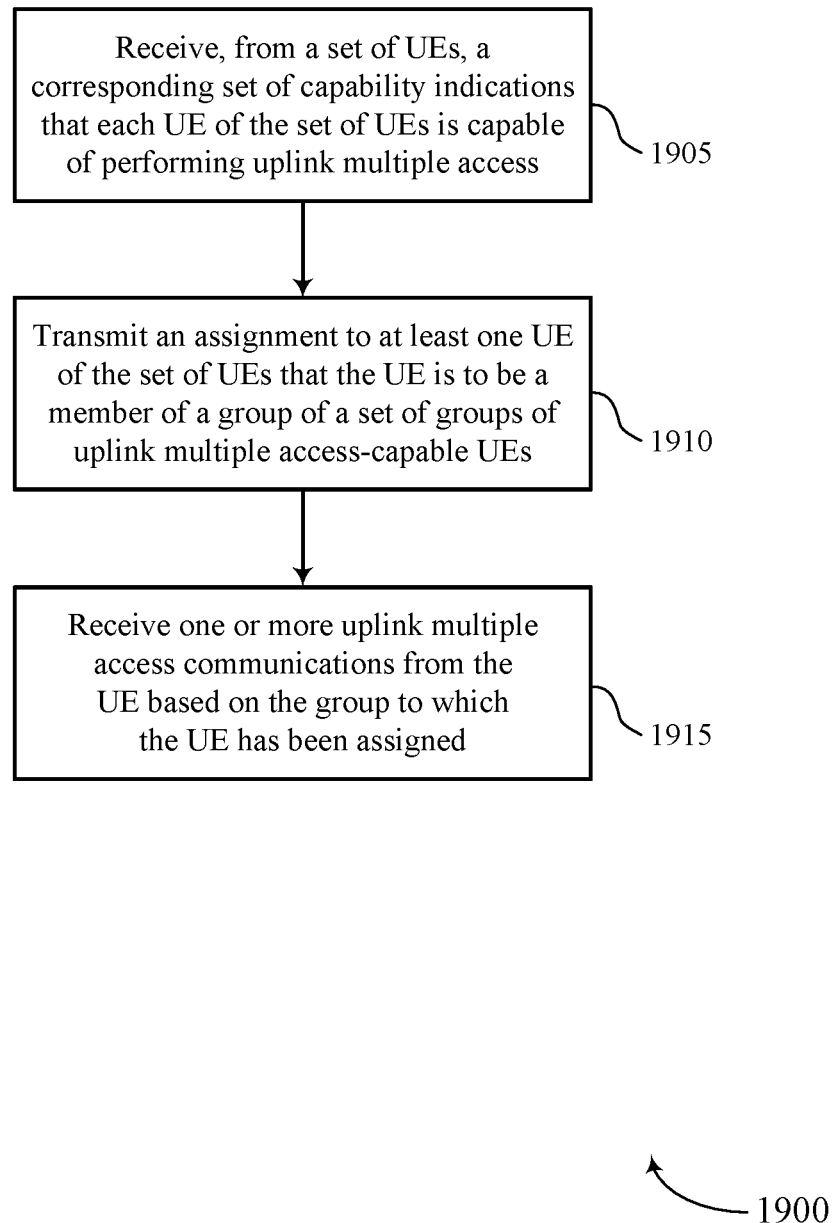

FIG. 19 shows a flowchart illustrating a method 1900 that supports UE grouping for uplink multiple access in accordance with aspects of the present disclosure. The operations of method 1900 may be implemented by a base station 105 or its components as described herein. For example, the operations of method 1900 may be performed by a base station multiple access communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may receive, from a set of UEs, a corresponding set of capability indications that each UE of the set of UEs is capable of performing uplink multiple access. The operations of 1905 may be performed according to the methods described herein. In some examples, aspects of the operations of 1905 may be performed by a multiple access capability indication component as described with reference to FIGS. 11 through 14.

At 1910, the base station may transmit an assignment to at least one UE of the set of UEs that the UE is to be a member of a group of a set of groups of uplink multiple access-capable UEs. The operations of 1910 may be performed according to the methods described herein. In some examples, aspects of the operations of 1910 may be performed by a multiple access group assignment component as described with reference to FIGS. 11 through 14.

At 1915, the base station may receive one or more uplink multiple access communications from the UE based on the group to which the UE has been assigned. The operations of 1915 may be performed according to the methods described herein. In some examples, aspects of the operations of 1915 may be performed by a multiple access group communications component as described with reference to FIGS. 11 through 14.

Figure 20:
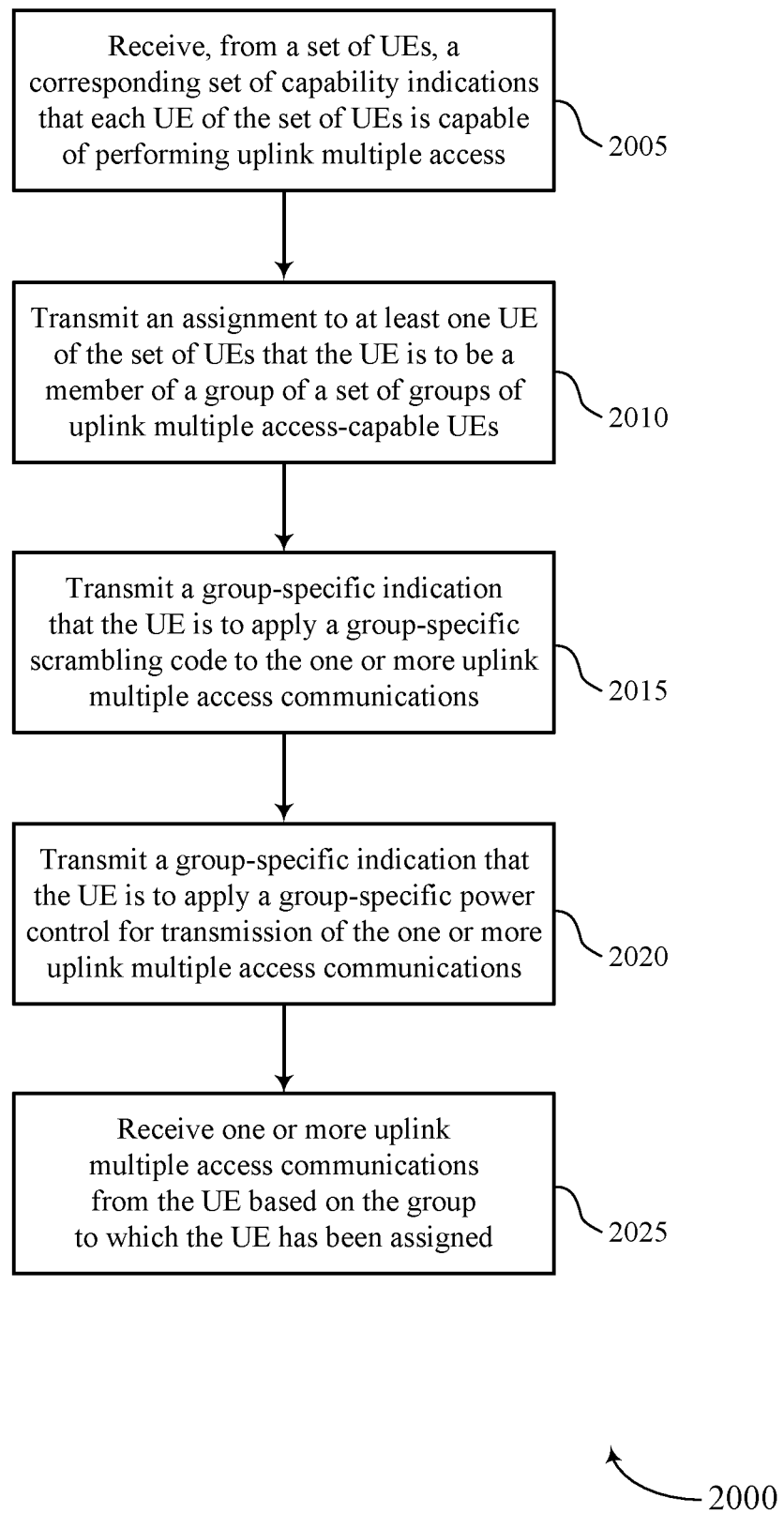

FIG. 20 shows a flowchart illustrating a method 2000 that supports UE grouping for uplink multiple access in accordance with aspects of the present disclosure. The operations of method 2000 may be implemented by a base station 105 or its components as described herein. For example, the operations of method 2000 may be performed by a base station multiple access communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may receive, from a set of UEs, a corresponding set of capability indications that each UE of the set of UEs is capable of performing uplink multiple access. The operations of 2005 may be performed according to the methods described herein. In some examples, aspects of the operations of 2005 may be performed by a multiple access capability indication component as described with reference to FIGS. 11 through 14.

At 2010, the base station may transmit an assignment to at least one UE of the set of UEs that the UE is to be a member of a group of a set of groups of uplink multiple access-capable UEs. The operations of 2010 may be performed according to the methods described herein. In some examples, aspects of the operations of 2010 may be performed by a multiple access group assignment component as described with reference to FIGS. 11 through 14.

At 2015, the base station may transmit a group-specific indication that the UE is to apply a group-specific scrambling code to the one or more uplink multiple access communications. The operations of 2015 may be performed according to the methods described herein. In some examples, aspects of the operations of 2015 may be performed by a multiple access signature group component as described with reference to FIGS. 11 through 14.

At 2020, the base station may transmit a group-specific indication that the UE is to apply a group-specific power control for transmission of the one or more uplink multiple access communications. The operations of 2020 may be performed according to the methods described herein. In some examples, aspects of the operations of 2020 may be performed by a multiple access signature group component as described with reference to FIGS. 11 through 14.

At 2025, the base station may receive one or more uplink multiple access communications from the UE based on the group to which the UE has been assigned. The operations of 2025 may be performed according to the methods described herein. In some examples, aspects of the operations of 2025 may be performed by a multiple access group communications component as described with reference to FIGS. 11 through 14.

Figure 21:
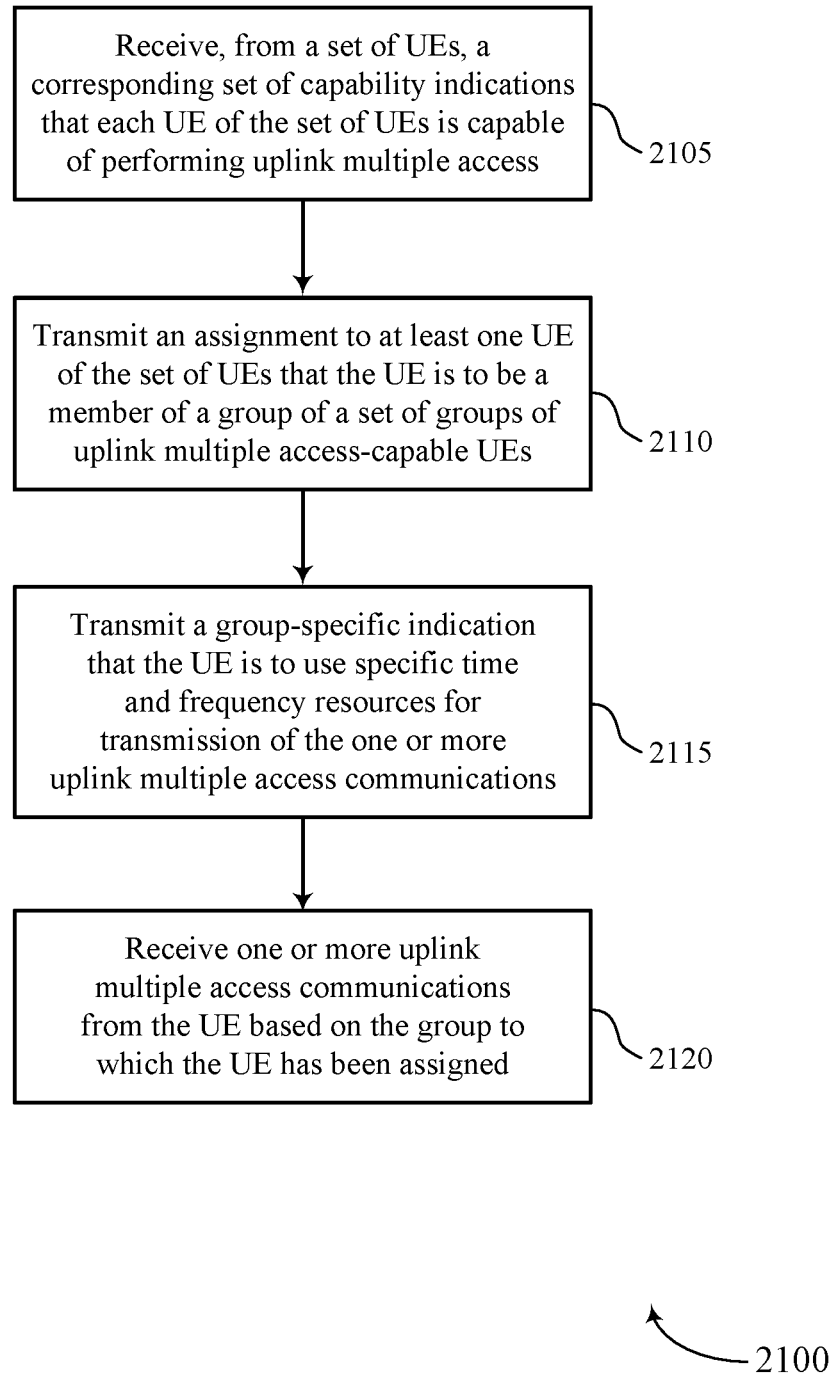

FIG. 21 shows a flowchart illustrating a method 2100 that supports UE grouping for uplink multiple access in accordance with aspects of the present disclosure. The operations of method 2100 may be implemented by a base station 105 or its components as described herein. For example, the operations of method 2100 may be performed by a base station multiple access communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may receive, from a set of UEs, a corresponding set of capability indications that each UE of the set of UEs is capable of performing uplink multiple access. The operations of 2105 may be performed according to the methods described herein. In some examples, aspects of the operations of 2105 may be performed by a multiple access capability indication component as described with reference to FIGS. 11 through 14.

At 2110, the base station may transmit an assignment to at least one UE of the set of UEs that the UE is to be a member of a group of a set of groups of uplink multiple access-capable UEs. The operations of 2110 may be performed according to the methods described herein. In some examples, aspects of the operations of 2110 may be performed by a multiple access group assignment component as described with reference to FIGS. 11 through 14.

At 2115, the base station may transmit a group-specific indication that the UE is to use specific time and frequency resources for transmission of the one or more uplink multiple access communications. The operations of 2115 may be performed according to the methods described herein. In some examples, aspects of the operations of 2115 may be performed by a group-specific resource component as described with reference to FIGS. 11 through 14.

At 2120, the base station may receive one or more uplink multiple access communications from the UE based on the group to which the UE has been assigned. The operations of 2120 may be performed according to the methods described herein. In some examples, aspects of the operations of 2120 may be performed by a multiple access group communications component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as CDMA, time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a network device, an assignment that the UE is to be a member of a group of a plurality of groups of uplink multiple access-capable UEs for a random access channel procedure, the assignment based at least in part on an association between one or more capabilities of the UE and capabilities of other UEs of the group to which the UE is assigned;
    receiving, from the network device, configuration information based at least in part on the group to which the UE has been assigned, the configuration information comprising a group-specific indication that the UE is to use specific time and frequency resources for transmission of one or more uplink multiple access communications, wherein the specific time and frequency resources indicated to the UE by the group-specific indication at least partially overlap with time and frequency resources assigned to other groups of the plurality of groups of uplink multiple access-capable UEs; and
    transmitting the one or more uplink multiple access communications to the network device based at least in part on the group to which the UE has been assigned, the one or more uplink multiple access communications comprising a first message of the random access channel procedure.

2. The method of claim 1, further comprising:
    transmitting, by the UE, a capability indication that the UE is capable of performing uplink multiple access.

3. The method of claim 1, wherein receiving the assignment that the UE is to be a member of the group comprises:
    receiving a group-specific indication that the UE is to apply a group-specific scrambling code to the one or more uplink multiple access communications.

4. The method of claim 1, wherein receiving the assignment that the UE is to be a member of the group comprises:
    receiving a group-specific indication that the UE is to apply a group-specific power control for transmission of the one or more uplink multiple access communications.

5. The method of claim 4, wherein the group-specific power control comprises a target receive power range associated with the group.

6. The method of claim 1, wherein the specific time and frequency resources indicated to the UE by the group-specific indication differ partially with the time and frequency resources assigned to other groups of the plurality of groups of uplink multiple access-capable UEs.

7. The method of claim 6, wherein a degree of overlap between the specific time and frequency resources indicated to the UE by the group-specific indication and time and frequency resources assigned to other groups of the plurality of groups of uplink multiple access-capable UEs is preconfigured.

8. The method of claim 6, wherein a degree of overlap between the specific time and frequency resources indicated to the UE by the group-specific indication and time and frequency resources assigned to other groups of the plurality of groups of uplink multiple access-capable UEs is based at least in part on a quality of service capability associated with the uplink multiple access-capable UEs.

9. The method of claim 1, wherein the specific time and frequency resources indicated to the UE by the group-specific indication represent a fraction of total time and frequency resources assigned to the plurality of groups of uplink multiple access-capable UEs, with at least some groups being assigned different fractions.

10. The method of claim 1, wherein a quantity of uplink multiple access-capable UEs in the group differs from a quantity of uplink multiple access-capable UEs in at least one other of the plurality of groups.

11. The method of claim 1, wherein the specific time and frequency resources are defined by one or more multiple access resource units, each multiple access resource unit occupying a predefined quantity of orthogonal frequency division multiplexing (OFDM) symbols and a predefined quantity of physical resource blocks (PRBs) or sub-PRBs.

12. The method of claim 11, wherein the predefined quantity of sub-PRBs is a fraction of tones of a single PRB.

13. The method of claim 11, wherein the predefined quantity of sub-PRBs includes consecutive or non-consecutive tones of a single PRB.

14. The method of claim 11, wherein at least one of the predefined quantity of OFDM symbols or the predefined quantity of PRBs or sub-PRBs is based at least in part on a system numerology and a capability of the uplink multiple access-capable UEs.

15. The method of claim 11, further comprising:
receiving a multiple access resource unit indication indicating the predefined quantity of OFDM symbols and the predefined quantity of PRBs or sub-PRBs.

16. The method of claim 1, wherein receiving the assignment that the UE is to be a member of the group comprises:
receiving the assignment as a preconfigured assignment via radio resource control (RRC) signaling.

17. The method of claim 1, wherein receiving the assignment that the UE is to be a member of the group comprises:
receiving the assignment as a dynamically-configured assignment via either a group-common physical downlink control channel (PDCCH) message or via remaining minimum system information (RMSI).

18. The method of claim 1, wherein receiving the assignment that the UE is to be a member of the group comprises:
receiving the assignment via UE-specific dynamic downlink control information (DCI).

19. The method of claim 1, wherein a quantity of the plurality of groups of uplink multiple access-capable UEs is based at least in part on a total quantity of uplink multiple access-capable UEs in communication with the network device and a quantity of orthogonal or quasi-orthogonal multiple access (MA) signatures supported by the total quantity of uplink multiple access-capable UEs.

20. The method of claim 19, wherein the orthogonal or quasi-orthogonal MA signatures vary by spreading codes, scrambling codes, permutation patterns, sparsity patterns, or combinations thereof.

21. The method of claim 1, wherein the configuration information comprises at least one of a set of pre-configured rules for a resource configuration and information associated with a multiple access signature generation.

22. An apparatus for wireless communication at a user equipment (UE), comprising:
a processor,
memory in electronic communication with the processor; and
instructions stored in the memory and executable by the processor to cause the apparatus to:
receive, from a network device, an assignment that the UE is to be a member of a group of a plurality of groups of uplink multiple access-capable UEs for a random access channel procedure, the assignment based at least in part on an association between one or more capabilities of the UE and capabilities of other UEs of the group to which the UE is assigned;
receive, from the network device, configuration information based at least in part on the group to which the UE has been assigned, the configuration information comprising a group-specific indication that the UE is to use specific time and frequency resources for transmission of one or more uplink multiple access communications, wherein the specific time and frequency resources indicated to the UE by the group-specific indication at least partially overlap with time and frequency resources assigned to other groups of the plurality of groups of uplink multiple access-capable UEs; and
transmit the one or more uplink multiple access communications to the network device based at least in part on the group to which the UE has been assigned, the one or more uplink multiple access communications comprising a first message of the random access channel procedure.

23. The apparatus of claim 22, wherein the instructions are executable by the processor to cause the apparatus to:
transmit, by the UE, a capability indication that the UE is capable of performing uplink multiple access.

24. The apparatus of claim 22, wherein the instructions to receive the configuration information based at least in part on the group to which the UE has been assigned are executable by the processor to cause the apparatus to:
receive a group-specific indication that the UE is to apply a group-specific scrambling code to the one or more uplink multiple access communications or apply a group-specific power control for transmission of the one or more uplink multiple access communications.

25. The apparatus of claim 24, wherein the group-specific power control comprises a target receive power range associated with the group.

26. The apparatus of claim 22, wherein the specific time and frequency resources indicated to the UE by the group-specific indication differ partially with the time and frequency resources assigned to other groups of the plurality of groups of uplink multiple access-capable UEs.

27. The apparatus of claim 26, wherein a degree of overlap between the specific time and frequency resources indicated to the UE by the group-specific indication and time and frequency resources assigned to other groups of the plurality of groups of uplink multiple access-capable UEs is preconfigured.

28. An apparatus for wireless communication at a user equipment (UE), comprising:
means for receiving, from a network device, an assignment that the UE is to be a member of a group of a plurality of groups of uplink multiple access-capable UEs for a random access channel procedure, the assignment based at least in part on an association between one or more capabilities of the UE and capabilities of other UEs of the group to which the UE is assigned;
means for receive, from the network device, configuration information based at least in part on the group to which the UE has been assigned, the configuration information comprising a group-specific indication that the UE is to use specific time and frequency resources for transmission of one or more uplink multiple access communications, wherein the specific time and frequency resources indicated to the UE by the group-specific indication at least partially overlap with time and frequency resources assigned to other groups of the plurality of groups of uplink multiple access-capable UEs; and
means for transmitting the one or more uplink multiple access communications to the network device based at least in part on the group to which the UE has been assigned, the one or more uplink multiple access communications comprising a first message of the random access channel procedure.

29. A non-transitory computer-readable medium storing code for wireless communication at a user equipment (UE), the code comprising instructions executable by a processor to:
receive, from a network device, an assignment that the UE is to be a member of a group of a plurality of groups of uplink multiple access-capable UEs for a random access channel procedure, the assignment based at least in part on an association between one or more capabilities of the UE and capabilities of other UEs of the group to which the UE is assigned;
receive, from the network device, configuration information based at least in part on the group to which the UE has been assigned, the configuration information comprising a group-specific indication that the UE is to use specific time and frequency resources for transmission of one or more uplink multiple access communications, wherein the specific time and frequency resources indicated to the UE by the group-specific indication at least partially overlap with time and frequency resources assigned to other groups of the plurality of groups of uplink multiple access-capable UEs; and transmit the one or more uplink multiple access communications to the network device based at least in part on the group to which the UE has been assigned, the one or more uplink multiple access communications comprising a first message of the random access channel procedure.

* * * * *